(12) United States Patent
Kawai

(10) Patent No.: US 8,028,316 B2
(45) Date of Patent: Sep. 27, 2011

(54) BROADCASTING SYSTEM, BROADCASTING STATION APPARATUS, RECEIVING DEVICE, AND BROADCASTING METHOD

(75) Inventor: Masahiro Kawai, Osaka (JP)

(73) Assignee: Panasonic Corporation, Osaka (JP)

( * ) Notice: Subject to any disclaimer, the term of this patent is extended or adjusted under 35 U.S.C. 154(b) by 391 days.

(21) Appl. No.: 11/569,579

(22) PCT Filed: May 23, 2005

(86) PCT No.: PCT/JP2005/009385
§ 371 (c)(1),
(2), (4) Date: Nov. 24, 2006

(87) PCT Pub. No.: WO2005/117422
PCT Pub. Date: Dec. 8, 2005

(65) Prior Publication Data
US 2008/0271075 A1    Oct. 30, 2008

(30) Foreign Application Priority Data

May 26, 2004    (JP) ................................. 2004/155824

(51) Int. Cl.
*H04N 5/44* (2011.01)
(52) U.S. Cl. ........................................................ 725/50
(58) Field of Classification Search .................. None
See application file for complete search history.

(56) References Cited

U.S. PATENT DOCUMENTS

| 5,585,865 A | 12/1996 | Amano et al. |
| 5,699,125 A | 12/1997 | Rzeszewski et al. |
| 5,801,787 A | 9/1998 | Schein et al. |
| 5,917,481 A | 6/1999 | Rzeszewski et al. |
| 5,959,688 A | 9/1999 | Schein et al. |
| 6,421,067 B1 * | 7/2002 | Kamen et al. ................. 715/719 |

(Continued)

FOREIGN PATENT DOCUMENTS

CN    1224301    7/1999

(Continued)

OTHER PUBLICATIONS

"Service Information for Digital Broadcasting System," ARIB STD-B10, version 3.8, Association of Radio Industries and Business.

(Continued)

*Primary Examiner* — Andrew Koenig
*Assistant Examiner* — Rong Le
(74) *Attorney, Agent, or Firm* — Greenblum & Bernstein, P.L.C.

(57) ABSTRACT

A receiving device receives a plurality of first and second program information. The first program information is information relating to each of broadcasting scheduled programs within a predetermined time period from the date of transmission of a broadcasting signal by a broadcasting station apparatus. The second program information is information relating to a broadcasting scheduled program in the future after a predetermined time period from the date of transmission of the broadcasting signal. A controller in the receiving device stores, when there is a reservation based on the second program information, the reserved second program information in a reservation information storage. Thereafter, the controller compares the reserved second program information with a plurality of first program information newly received, and determines whether or not there is first program information that coincides with the second program information. The controller updates, when there is first program information that coincides with the second program information, information relating to the reserved program stored in the reservation information storage on the basis of the first program information.

2 Claims, 21 Drawing Sheets

MAY 1 : FIRST PROGRAM INFORMATION

| PROGRAM IDENTIFIER | CHANNEL | START TIME | PROGRAM TITLE | GENRE |
|---|---|---|---|---|
| 1912 | 100 | 5/1 0:00 | MIDNIGHT NEWS | NEWS-REPORT |
| 1913 | 100 | 5/1 3:45 | MIDNIGHT MOVIE THEATER | MOVIE |
| 1914 | 100 | 5/1 5:00 | EARLY-MORNING NEWS FIVE | NEWS-REPORT |
| ... | ... | ... | ... | ... |
| 2128 | 100 | 5/8 19:00 | SUPERHIT STUDIO | MUSIC |
| 2129 | 100 | 5/8 20:00 | ANCIENT PEOPLE | DOCUMENTARY-CULTURE |
| 2130 | 100 | 5/8 21:00 | SUNDAY MISTERY SHOW | DRAMA |
| 2131 | 100 | 5/8 23:00 | VARIETY LIFE TALK | VARIETY SHOW |

U.S. PATENT DOCUMENTS

| | | | |
|---|---|---|---|
| 6,460,018 B1 * | 10/2002 | Kasai et al. ............... 705/8 |
| 6,470,497 B1 * | 10/2002 | Ellis et al. ............... 725/39 |
| 6,588,014 B1 | 7/2003 | Hayashi |
| 6,591,421 B1 | 7/2003 | Sullivan |
| 6,751,401 B1 | 6/2004 | Arai et al. |
| 7,228,557 B1 | 6/2007 | Korehisa et al. |
| 2001/0005374 A1 | 6/2001 | Kumazaki et al. |
| 2001/0013126 A1 * | 8/2001 | Lemmons et al. ............... 725/53 |
| 2001/0021995 A1 * | 9/2001 | Hatano ............... 725/50 |
| 2001/0052126 A1 | 12/2001 | Nanki et al. |
| 2002/0049971 A1 * | 4/2002 | Augenbraun et al. ............... 725/39 |
| 2002/0056099 A1 * | 5/2002 | Takahashi et al. ............... 725/39 |
| 2003/0051244 A1 * | 3/2003 | Klopfenstein ............... 725/46 |
| 2003/0084443 A1 * | 5/2003 | Laughlin et al. ............... 725/39 |
| 2003/0093795 A1 * | 5/2003 | Takahashi et al. ............... 725/49 |
| 2003/0106060 A1 * | 6/2003 | Inoue ............... 725/56 |
| 2003/0192048 A1 | 10/2003 | Sullivan |
| 2003/0220100 A1 * | 11/2003 | McElhatten et al. ............... 455/418 |
| 2005/0055715 A1 * | 3/2005 | Minnick et al. ............... 725/58 |
| 2005/0071875 A1 * | 3/2005 | Kempisty ............... 725/56 |
| 2005/0141871 A1 * | 6/2005 | Watanabe ............... 386/83 |
| 2008/0271075 A1 * | 10/2008 | Kawai ............... 725/39 |

FOREIGN PATENT DOCUMENTS

| | | |
|---|---|---|
| CN | 1295288 | 5/2001 |
| EP | 0905985 | 3/1999 |
| EP | 1063797 | 12/2000 |
| EP | 1115253 | 7/2001 |
| JP | 10-322613 | 12/1998 |
| JP | 11-191868 | 7/1999 |
| JP | 11-355674 | 12/1999 |
| JP | 2000-013756 | 1/2000 |
| JP | 2000-032407 | 1/2000 |
| JP | 2000-050216 | 2/2000 |
| JP | 2000-341156 | 12/2000 |
| JP | 2001-054034 | 2/2001 |
| JP | 2001-251563 | 9/2001 |
| JP | 2002-007460 | 1/2002 |
| JP | 2002-232829 | 8/2002 |

OTHER PUBLICATIONS

English language Abstract JP 2001-251563.
English language Abstract JP 10-322613.
English language Abstract JP 2000-032407.
English language Abstract JP 2000-013756.
English language Abstract JP 2001-054034.
English language Abstract JP 2002-232829.
English language Abstract JP 2002-007460.
English language Abstract JP 11-191868.
English language Abstract JP 11-355674.
English language Abstract JP 2000-341156.
English language Abstract JP 2000-050216.

* cited by examiner

FIG. 2a

MAY 1 : FIRST PROGRAM INFORMATION

| PROGRAM IDENTIFIER | CHANNEL | START TIME | PROGRAM TITLE | GENRE |
|---|---|---|---|---|
| 1912 | 100 | 5/1 0:00 | MIDNIGHT NEWS | NEWS·REPORT |
| 1913 | 100 | 5/1 3:45 | MIDNIGHT MOVIE THEATER | MOVIE |
| 1914 | 100 | 5/1 5:00 | EARLY-MORNING NEWS FIVE | NEWS·REPORT |
| ⋮ | ⋮ | ⋮ | ⋮ | ⋮ |
| 2128 | 100 | 5/8 19:00 | SUPERHIT STUDIO | MUSIC |
| 2129 | 100 | 5/8 20:00 | ANCIENT PEOPLE | DOCUMENTARY·CULTURE | ← X
| 2130 | 100 | 5/8 21:00 | SUNDAY MISTERY SHOW | DRAMA |
| 2131 | 100 | 5/8 23:00 | VARIETY LIFE TALK | VARIETY SHOW |

FIG. 2b

MAY 1 : SECOND PROGRAM INFORMATION

| CHANNEL | START TIME | PROGRAM TITLE |
|---|---|---|
| 100 | 5/9 19:00 | EVENING NEWS |
| 100 | 5/9 20:00 | LIVE BROADCAST OF WORLD CUP SPORT | ← Y
| 100 | 5/10 18:00 | COMEDY BATTLE ■○× |
| 100 | 5/10 23:00 | SUPERSPORT BORING |
| ⋮ | ⋮ | ⋮ |

FIG. 3a

MAY 2 : FIRST PROGRAM INFORMATION

| PROGRAM IDENTIFIER | CHANNEL | START TIME | PROGRAM TITLE | GENRE |
|---|---|---|---|---|
| 1943 | 100 | 5/2 0:00 | MIDNIGHT NEWS | NEWS·REPORT |
| 1944 | 100 | 5/2 3:30 | JAPANESE WORKER | DOCUMENTARY·CULTURE |
| 1945 | 100 | 5/2 5:00 | TODAY'S WEATHER | NEWS·REPORT |
| ... | ... | ... | ... | ... |
| 2156 | 100 | 5/9 19:00 | EVENING NEWS | NEWS·REPORT |
| 2157 | 100 | 5/9 19:45 | LATEST MOVIE INFORMATION | INFORMATION·GOSSIP SHOW |
| 2158 | 100 | 5/9 20:00 | SPECIAL LIVE BROADCAST OF WORLD CUP SPORT | SPORT |
| 2159 | 100 | 5/9 22:30 | SUSPENSE SHOW ○△× | DRAMA |

MAY 2 : SECOND PROGRAM INFORMATION

| CHANNEL | START TIME | PROGRAM TITLE |
|---|---|---|
| 100 | 5/10 18:00 | COMEDY BATTLE ■○× |
| 100 | 5/10 23:00 | SUPERSPORT BORING |
| 100 | 5/11 19:00 | USUAL ANIMATION ○○○ |
| 100 | 5/11 20:30 | TV GOOD FOR BODY |

F I G. 4 a

PA1: FIRST FLAG | PROGRAM IDENTIFIER | CHANNEL | BROADCASTING START TIME | PROGRAM TITLE | GENRE

F I G. 4 b

PA2: SECOND FLAG | CHANNEL | BROADCASTING START TIME | PROGRAM TITLE

FIG. 10

DIGITAL ◎◎ WAVE PROGRAM LISTING RETRIEVE BY DATE

|       | SUN. | MON. | TUE. | WED. | THU. | FRI. | SAT. |
|-------|------|------|------|------|------|------|------|
| APRIL | 10   | 11   | 12   | 13   | 14   | 15   | 16   |
|       | 24   | 25   | 26   | 27   | 28   | 29   | 30   |
| MAY   | 22   | 8    | 9    | 10   |      | 1    |      |
|       |      | 23   |      | 11   | 12   | 13   | 14   |
|       |      | 15   | 16   | 17   | 18   | 19   | 20   |
|       |      | 29   | 30   | 31   |      | 5    | 6    |
|       |      |      |      |      |      |      | 7    |
|       |      |      |      |      |      |      | 21   | ch1000X Presented by ◎◎◎ BROADCASTING
[AD] △△ TICKET ADVANCE ORDER IS BEING ACCEPTED
MAY 9 (MON.) LIFE☆MORNING ▽WHAT TO DO WITH YOUR PENSION
08:30～09:50 SECRET OF YOUR INVESTMENT ACTIVITY ch100～ch104

|       | ch100 □□△ BROADCASTING | ch101 O×K BROADCASTING | ch102 OOS BROADCASTING BEING WATCHED | ch103 MOO BROADCASTING | ch104 Q×☆ BROADCASTING |
|-------|---|---|---|---|---|
| 8:00  | 00 STOCK | 02 SUNDAY DRAMA SERIES 「I WANT TO BE A FARMER'S HUSBAND」 | 00 SPECIAL EFFECTS MOVIE INTRODUCTION | 00 SPRING SPECTACULAR CELEBRITIES GATHERED SINGING CONTEST [PERFORMER] 口〇△夫 口〇山〇郎 丸 | 00 GENERAL △ロ 「SAVE ABCDEFG VILLAGE」 [PERFORMER] 松〇×丸 ... |
|       | 30 LIFE☆ MORNING |   |   |   |   |
|       |   |   | 30 DRESS-UP SERIES 「PUT ON KIMONO」 |   |   |
| 9:00  | 00 NEWS | 00 SHOPPING 「SURPRISING PRICE」 |   |   |   |

THE PROGRAM MAY BE VARIED BECAUSE OF STATION'S CONVENIENCE

BEING WATCHED

AD 1

AD 2

FIG. 11a
DT1
| | SUN. | MON. | TUE. | WED. | THU. | FRI. | SAT. | SUN. | MON. | TUE. | WED. | THU. | FRI. | SAT. |
|---|---|---|---|---|---|---|---|---|---|---|---|---|---|---|
| APRIL | | | | | | 1 | 2 | 3 | 4 | 5 | 6 | 7 | 8 | 9 |
| | 10 | 11 | 12 | 13 | 14 | 15 | 16 | 17 | 18 | 19 | 20 | 21 | 22 | 23 |
| | 24 | 25 | 26 | 27 | 28 | 29 | 30 | | | | | | | |
| MAY | | | | | | | | 1 | 2 | 3 | 4 | 5 | 6 | 7 |
| | 8 | 9 | 10 | 11 | 12 | 13 | 14 | 15 | 16 | 17 | 18 | 19 | 20 | 21 |
| | 22 | 23 | 24 | 25 | 26 | 27 | 28 | 29 | 30 | 31 | | | | |
FIG. 11b
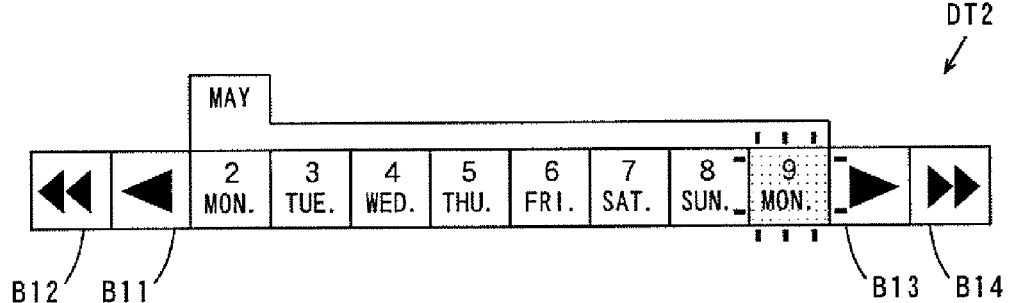
FIG. 11c
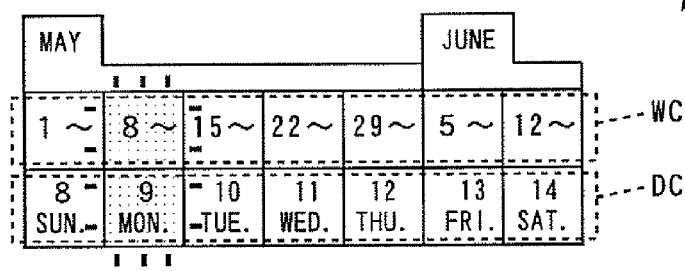

F I G. 1 5
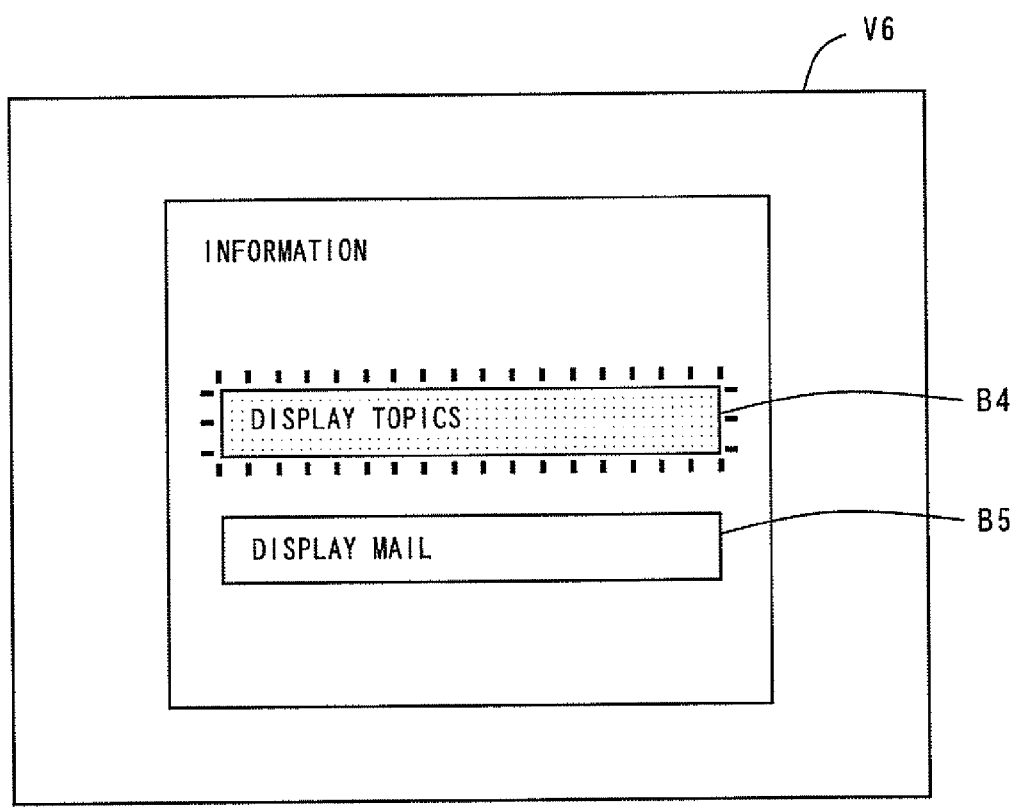

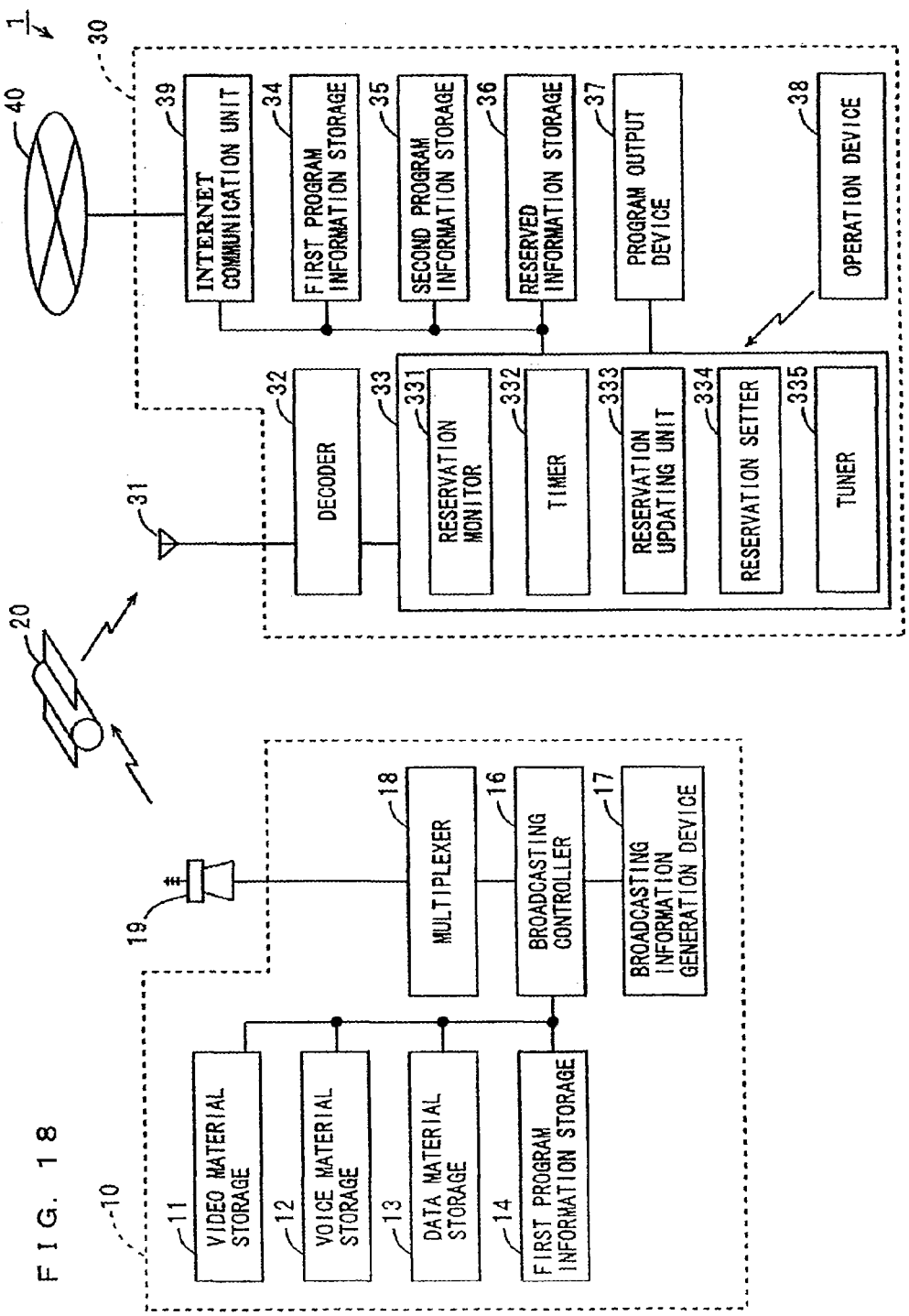

FIG. 19a

MAY 1 : FIRST PROGRAM INFORMATION

| FIRST PROGRAM IDENTIFIER | CHANNEL | START TIME | PROGRAM TITLE | GENRE | SECOND PROGRAM IDENTIFIER |
|---|---|---|---|---|---|
| 1912 | 100 | 5/1 0:00 | MIDNIGHT NEWS | NEWS·REPORT | 11101 |
| 1913 | 100 | 5/1 3:45 | MIDNIGHT MOVIE THEATER | MOVIE | 11102 |
| 1914 | 100 | 5/1 5:00 | EARLY-MORNING NEWS FIVE | NEWS·REPORT | — |
| ... | ... | ... | ... | ... | ... |
| 2128 | 100 | 5/8 19:00 | SUPERHIT STUDIO | MUSIC | — |
| 2129 | 100 | 5/8 20:00 | ANCIENT PEOPLE | DOCUMENTARY·CULTURE | 88801 |
| 2130 | 100 | 5/8 21:00 | SUNDAY MISTERY SHOW | DRAMA | 88802 |
| 2131 | 100 | 5/8 23:00 | VARIETY LIFE TALK | VARIETY SHOW | — |

FIG. 19b

MAY 1 : SECOND PROGRAM INFORMATION

| CHANNEL | START TIME | PROGRAM TITLE | SECOND PROGRAM IDENTIFIER |
|---|---|---|---|
| 100 | 5/9 19:00 | EVENING NEWS | 99901 |
| 100 | 5/9 20:00 | LIVE BROADCAST OF WORLD CUP SPORT | 99902 |
| 100 | 5/10 18:00 | COMEDY BATTLE ■○× | 00001 |
| 100 | 5/10 23:00 | SUPERSPORT BORING | 00002 |

T ←

FIG. 20a
MAY 2 : FIRST PROGRAM INFORMATION

| FIRST PROGRAM IDENTIFIER | CHANNEL | START TIME | PROGRAM TITLE | GENRE | SECOND PROGRAM IDENTIFIER |
|---|---|---|---|---|---|
| 1943 | 100 | 5/2 0:00 | MIDNIGHT NEWS | NEWS·REPORT | 22203 |
| 1944 | 100 | 5/2 3:30 | JAPANESE WORKER | DOCUMENTARY· CULTURE | 22204 |
| 1945 | 100 | 5/2 5:00 | TODAY'S WEATHER | NEWS·REPORT | — |

⋮

| 2156 | 100 | 5/9 19:00 | EVENING NEWS | NEWS·REPORT | 99901 |
| 2157 | 100 | 5/9 19:45 | LATEST MOVIE INFORMATION | INFORMATION· GOSSIP SHOW | — |
| 2158 | 100 | 5/9 20:00 | SPECIAL LIVE BROADCAST OF WORLD CUP SPORT | SPORT | 99902 |
| 2159 | 100 | 5/9 22:30 | SUSPENSE SHOW ○△× | DRAMA | — |

← R
← U

FIG. 20b
MAY 2 : SECOND PROGRAM INFORMATION

| CHANNEL | START TIME | PROGRAM TITLE | SECOND PROGRAM IDENTIFIER |
|---|---|---|---|
| 100 | 5/10 18:00 | COMEDY BATTLE ■○× | 00001 |
| 100 | 5/10 23:00 | SUPERSPORT BORING | 00002 |
| 100 | 5/11 19:00 | USUAL ANIMATION ○○○ | 01101 |
| 100 | 5/11 20:30 | TV GOOD FOR BODY | 01102 |

⋮

F I G. 2 1 a

| FIRST FLAG | FIRST PROGRAM IDENTIFIER | CHANNEL | BROADCASTING START TIME | PROGRAM TITLE | GENRE | SECOND PROGRAM IDENTIFIER |
|---|---|---|---|---|---|---|

PB1

F I G. 2 1 b

| SECOND FLAG | CHANNEL | BROADCASTING START TIME | PROGRAM TITLE | SECOND PROGRAM IDENTIFIER |
|---|---|---|---|---|

PB2

BROADCASTING SYSTEM, BROADCASTING STATION APPARATUS, RECEIVING DEVICE, AND BROADCASTING METHOD

TECHNICAL FIELD

The present invention relates to a broadcasting system, a broadcasting station apparatus, a receiving device, and a broadcasting method.

BACKGROUND ART

Broadcasting systems comprise broadcasting station apparatuses serving as transmission systems for transmitting program broadcasting signals from broadcasting stations, and receiving devices (e.g. television receivers or the like) serving as receiving systems for receiving the broadcasting signals transmitted by the broadcasting station apparatuses.

In a digital broadcasting system, a plurality of information are multiplexed on a broadcasting signal transmitted from a transmission system to a receiving system so that the function of the receiving system is diversified to meet viewers' requirements.

For example, a service for presenting information relating to programs scheduled to be broadcast (hereinafter referred to as broadcasting scheduled programs) to viewers have been put to practical use. This service causes the information relating to the broadcasting scheduled programs to be multiplexed on a broadcasting signal as EPS (Electric Program Guide) data in a transmission system and be transmitted to a receiving system. In the receiving system, the EPG data is extracted from the fed broadcasting signal, so that the information relating to the broadcasting scheduled programs are presented to the viewer.

The information relating to the broadcasting scheduled programs can be displayed on a television screen by thus multiplexing the EPG data on the broadcasting signal. This makes it possible for the viewer to designate the desired broadcasting scheduled program on the basis of the displayed information relating to the broadcasting scheduled programs and reserve the designated program. Such a function that the viewer can reserve the desired broadcasting scheduled program is hereinafter referred to as a program reserving function.

Here, there is a character broadcasting receiving device comprising the program reserving function (see Patent Document 1, for example). In the EPG data used for the character broadcasting receiving device, a "program title", a "broadcasting start time", a "program end time", a "channel", and a "program identifier" are associated with each of the broadcasting scheduled programs.

The "program title" is the title of the associated broadcasting scheduled program, and the "broadcasting start time" is the time when the broadcasting scheduled program is scheduled to start. The "broadcasting end time" is the time when the broadcasting scheduled program is scheduled to end, and the "channel" is a channel on which the broadcasting scheduled program is broadcast. The "program identifier" is for identifying each of the broadcasting scheduled programs and a program that is being broadcast.

The EPG data is inputted to the character broadcasting receiving device, and the inputted EPG data is stored in a buffer memory as needed. In a case where the viewer reserves a desired broadcasting scheduled program (hereinafter referred to as a designated program), the EPG data relating to the designated program out of the EPG data stored in the buffer memory is stored in a reserved program memory. That is, the "program title", the "broadcasting start time", the "broadcasting end time", the "channel", and the "program identifier" that are associated with the designated program are stored in the reserved program memory.

Therefore, a microcomputer in the character broadcasting receiving device compares the "broadcasting start time" for the designated program stored in the reserved program memory with the current time measured by a timer circuit. The microcomputer tunes in to the "channel" for the designated program when the current time comes closer to the "broadcasting start time" for the designated program.

The microcomputer extracts the EPG data relating to the broadcasting scheduled program, which coincides with the "channel" for the designated program, out of the EPG data continuously stored in the buffer memory. Further, the microcomputer extracts the EPG data relating to the designated program out of the EPG data on the basis of the "program identifier" for the designated program.

Thereafter, the microcomputer compares the "broadcasting start time" and the "broadcasting end time" in the EPG data relating to the designated program extracted from the buffer memory with the "broadcasting start time" and the "broadcasting end time" for the designated program stored in the reserved program memory. Thus, it is determined whether or not there are changes in the "broadcasting start time" and the "broadcasting end time" for the designated program.

In a case where there are no changes, on the basis of the "broadcasting start time" and the "broadcasting end time" for the designated program stored in the reserved program memory, the designated program is recorded. On the other hand, in a case where there are changes, the "broadcasting start time" and the "broadcasting end time" for the designated program stored in the reserved program memory are changed on the basis of the EPG data relating to the designated program extracted from the buffer memory.

Thus, in the character broadcasting receiving device in Patent Document 1, when the "broadcasting start time" and the "broadcasting end time" for the designated program, which will be actually broadcast after being reserved, are changed, the "broadcasting start time" and the "broadcasting end time" for the designated program stored in the reserved program memory are changed on the basis of the "program identifier" in the EPG data inputted as needed.

In the current digital broadcasting system, pfEIT (present following Event Information Table) data is transmitted from a transmission system to a receiving system. The pfEIT data represents information relating to programs that are being currently broadcast and will be next broadcast. In the pfEIT data, the above-mentioned "program identifier", "broadcasting start time", and "broadcasting end time" are also associated with each of the programs that are being currently broadcast and will be next broadcast.

In a case where the pfEIT data is transmitted from the transmission system, the character broadcasting receiving device monitors the "program identifier" in the pfEIT data, and compares the EPG data relating to the designated program stored in the reserved program memory with the pfEIT data.

The character broadcasting receiving device extracts the EPG data relating to the designated program stored in the reserved program memory and the pfEIT data relating to the same program as the designated program on the basis of the "program identifier". Therefore, the character broadcasting receiving device determines whether or not there are changes in the "broadcasting start time" and the "broadcasting end time" for the designated program, and changes the "broadcasting start time" and the "broadcasting end time" for the designated program stored in the reserved program memory when there are changes.

The character broadcasting receiving device thus makes it possible for the viewer to reliably record the designated program even in a case where the time when the designated program is broadcast is changed from the time point where the designated program is reserved to the actual time of broadcasting.

[Patent Document 1] JP 2000-50216 A

DISCLOSURE OF THE INVENTION

Problems to be Solved by the Invention

As a service for presenting information relating to a broadcasting scheduled program to a viewer has been put to practical use, Program Arrangement Information Standard (STD-B10) employed for a digital broadcasting system has been formulated by Association of Radio Industries and Businesses (ARIS). In the current digital broadcasting system, therefore, EPG data is transmitted from a transmission system on the basis of the standard.

In the above-mentioned standard, the contents of the EPG data transmitted from the transmission system to a receiving system are limited to broadcasting scheduled programs within a predetermined time period (e.g., corresponding to one week) from the time of transmission of the EPG data.

On the other hand, organization of future broadcasting scheduled programs (hereinafter referred to as future programs) after a predetermined time period (one week) from the time of transmission of the EPG data was transmitted by the transmission system may, in some cases, be determined.

Even in such a case, the EPG data relating to the future program whose organization has already been determined is not transmitted from the transmission system to the receiving system according to the above-mentioned standard. Consequently, the viewer cannot reserve the future program.

In such a way, the following is the reason why the EPG data relating to the future program whose organization has already been determined is not transmitted from the transmission system to the receiving system.

As described above, in the current program reserving function, EPG data including a "program identifier" must be transmitted from the transmission system to the receiving system. In the configuration of the current transmission system, when the organization of all broadcasting scheduled programs within a predetermined time period from the time of transmission of the EPG data was transmitted is not determined, however, the "program identifier" cannot be associated with each of the broadcasting scheduled programs.

That is, even if the future program whose organization has already been determined exists, the organization of all the future programs is not determined in the future after a predetermined time period from the time of transmission of the EPG data, so that the "program identifier" cannot be associated with each of the broadcasting scheduled programs Consequently, the "program identifier" relating to the future program is not transmitted from the transmission system to the receiving system. As a result, the viewer cannot reserve the future program.

Means for Solving the Problems

An object of the present invention is to provide a broadcasting system, a broadcasting station apparatus, a receiving device, and a broadcasting method capable of reserving not only a broadcasting scheduled program within a predetermined time period from the time of transmission of a broadcasting signal but also a broadcasting scheduled program after a predetermined time period from the time of transmission of the broadcasting signal.

(1)

A broadcasting system according to an aspect of the present invention is a broadcasting system comprising a broadcasting station apparatus that transmits a broadcasting signal including the contents of a program and a receiving device that receives the broadcasting signal including the contents of the program, wherein the broadcasting station apparatus includes a transmitter that transmits the broadcasting signal, and a program information generator that generates first program information relating to a broadcasting scheduled program within a predetermined time period from the time of transmission of the broadcasting signal and second program information relating to a broadcasting scheduled program after the predetermined time period from the time of transmission of the broadcasting signal, the transmitter transmits the first program information generated by the program information generator together with the broadcasting signal, the first program information includes a first program identifier for identifying the broadcasting scheduled program within the predetermined time period and organization information relating to organization of the broadcasting scheduled program, the second program information includes organization information relating to organization of the broadcasting scheduled program, and the receiving device includes a receiver that receives the broadcasting signal and the first program information, an acquisition unit that acquires the second program information, a storage that stores the first program information received by the receiver and the second program information acquired by the acquisition unit, and a reservation unit that reserves the broadcasting scheduled program on the basis of the first or second program information stored in the storage.

In the broadcasting station apparatus in the broadcasting system, the first program information relating to the broadcasting scheduled program within the predetermined time period from the time of transmission of the broadcasting signal and the second program information relating to the broadcasting scheduled program after the predetermined time period from the time of transmission of the broadcasting signal are generated by the program information generator. The first program information generated by the program information generator, together with the broadcasting signal, is transmitted by the transmitter.

On the other hand, in the receiving device in the broadcasting system, the broadcasting signal and the first program information are received by the receiver, the second program information is acquired by the acquisition unit, and the first program information received by the receiver and the second program information acquired by the acquisition unit are stored by the storage.

The broadcasting scheduled program is reserved by the reservation unit on the basis of the first program identifier for identifying the broadcasting scheduled program within the predetermined time period included in the first program information and the organization information relating to organization of the broadcasting scheduled program or the organization information relating to organization of the broadcasting scheduled program included in the second program information.

Thus, the viewer can also reserve not only the broadcasting scheduled program within the predetermined time period from the time of transmission of the broadcasting signal but also the broadcasting scheduled program after the predetermined time period from the time of transmission of the broadcasting signal.

(2)

The transmitter in the broadcasting station apparatus may transmit the second program information generated by the program information generator together with the broadcasting signal, and the receiver in the receiving device may function as the acquisition unit, and further receive the second program information, to acquire the second program information.

In this case, the second program information generated by the program information generator in the broadcasting station apparatus, together with the broadcasting signal, is transmitted by the transmitter. The second program information transmitted by the transmitter is received by the receiver in the receiving device. Thus, the acquisition of the second program information in the receiving device is reliably performed.

(3)

The receiving device may further include an input device for inputting the second program information, and the acquisition unit in the receiving device may acquire the second program information inputted by the input device. In this case, the second program information inputted by the input device is acquired by the acquisition unit in the receiving device. Thus, the acquisition of the second program information in the receiving device is reliably performed.

(4)

The second program information may be stored in a predetermined server connected to the Internet, and the acquisition unit in the receiving device may acquire the second program information by downloading from the predetermined server through the Internet. In this case, the second program information is downloaded from the predetermined server through the Internet by the acquisition unit in the receiving device. Thus, the acquisition of the second program information in the receiving device is reliably performed.

(5)

The receiving device may further include a storing unit that stores the first or second program information corresponding to the broadcasting scheduled program reserved by the reservation unit, a replacement unit that replaces, when the first program information corresponding to the second program information stored in the storing unit is received by the receiver, the second program information stored in the storing unit with the first program information received by the receiver, and an output unit that outputs a broadcasting signal corresponding to the broadcasting scheduled program reserved by the reservation unit on the basis of the first program identifier in the first program information stored in the storage.

In this case, the storing unit stores the first or second program information corresponding to the broadcasting scheduled program reserved by the reservation unit. When the first program information corresponding to the second program information stored in the storing unit is received by the receiver, the replacement unit replaces the second program information stored in the storing unit with the received first program information.

The output unit outputs the broadcasting signal corresponding to the broadcasting scheduled program reserved by the reservation unit on the basis of the first program identifier in the first program information stored in the storage.

This makes it possible for the viewer to view or record a program corresponding to the broadcasting scheduled program on the basis of the outputted broadcasting signal.

(6)

The organization information may include a broadcasting start time, a broadcasting channel, and a program title for the broadcasting scheduled program, the receiving device may further comprise a determination unit that determines a correspondence relationship between the second program information stored in the storing unit and the first program information received by the receiver on the basis of the broadcasting start time, the broadcasting channel, and the program title for the broadcasting scheduled program, and the replacement unit may replace the second program information stored in the storing unit with the first program information received by the receiver on the basis of the correspondence relationship determined by the determination unit.

In this case, in the receiving device, the determination unit determines the correspondence relationship between the second program information stored in the storing unit and the first program information received by the receiver on the basis of the organization information including the broadcasting start time, the broadcasting channel, and the program title for the broadcasting scheduled program. The replacement unit replaces the second program information stored in the storing unit with the received first program information on the basis of the determined correspondence relationship.

Thus, the correspondence relationship between the second program information stored in the storing unit and the first program information received by the receiver is reliably determined, and the second program information is accurately replaced with the first program information.

As a result, the viewer can accurately output a program broadcasting signal corresponding to the reserved broadcasting scheduled program and accurately view or record the program on the basis of the broadcasting signal.

(7)

The second program information may include a second program identifier for identifying the broadcasting scheduled program after the predetermined time period, the first program information corresponding to the second program information may include the second program identifier, the receiving device may further include a determination unit that determines a correspondence relationship between the second program information stored in the storing unit and the first program information received by the receiver on the basis of the second program identifier, and the replacement unit may replace the second program information stored in the storing unit with the first program information received by the receiver on the basis of the correspondence relationship determined by the determination unit.

In this case, the correspondence relationship between the second program information stored in the storing unit and the first program information received by the receiver is determined by the determination unit on the basis of the second program identifier.

Thus, the correspondence relationship between the second program information stored in the storing unit and the first program information received by the receiver is reliably determined, and the second program information is accurately replaced with the first program information.

As a result, the viewer can accurately output the program broadcasting signal corresponding to the reserved broadcasting scheduled program and accurately view or record the program on the basis of the broadcasting signal.

(8)

A receiving device according to another aspect of the present invention is a receiving device that receives a broadcasting signal including the contents of a program transmitted from a broadcasting station apparatus, comprising a receiver that receives the broadcasting signal and first program information relating to a broadcasting scheduled program within a predetermined time period from the date of transmission of the broadcasting signal by the broadcasting station apparatus;

an acquisition unit that acquires second program information relating to a broadcasting scheduled program after the predetermined time period; a storage that stores the first program information received by the receiver and the second program information acquired by the acquisition unit; and a reservation unit that reserves the broadcasting scheduled program on the basis of the first or second program information stored in the storage, the first program information including a first program identifier for identifying the broadcasting scheduled program within the predetermined time period and organization information relating to organization of the broadcasting scheduled program, and the second program information including organization information relating to organization of the broadcasting scheduled program.

In the receiving device, the receiver receives the broadcasting signal and the first program information, the acquisition unit acquires the second program information, and the storage stores the first program information received by the receiver and the second program information acquired by the acquisition unit.

Therefore, the reservation unit reserves the broadcasting scheduled program on the basis of the first program identifier and the organization information that are included in the first program information or the organization information included in the second program information.

This makes it possible for the viewer to reserve not only the broadcasting scheduled program within the predetermined time period from the time of transmission of the broadcasting signal but also the broadcasting scheduled program after the predetermined time period from the time of transmission of the broadcasting signal.

(9)

The second program information may be transmitted by the broadcasting station apparatus, and the receiver may function as the acquisition unit, and further receive the second program information, to acquire the second program information. In this case, the second program information is transmitted by the broadcasting station apparatus. The second program information transmitted by the broadcasting station apparatus is received by the receiver. Thus, the acquisition of the second program information is reliably performed.

(10)

The receiving device may further include an input device for inputting the second program information, and the acquisition unit may acquire the second program information inputted by the input device. In this case, the second program information inputted by the input device is acquired by the acquisition unit. Thus, the acquisition of the second program information is reliably performed.

(11)

The second program information may be stored in a predetermined server connected to the Internet, and the acquisition unit may acquire the second program information by downloading from the predetermined server through the Internet. In this case, the second program information is downloaded from the predetermined server through the Internet by the acquisition unit. Thus, the acquisition of the second program information is reliably performed.

(12)

The receiving device may further include a storing unit that stores the first or second program information corresponding to the broadcasting scheduled program reserved by the reservation unit, a replacement unit that replaces, when the first program information corresponding to the second program information stored in the storing unit is received by the receiver, the second program information stored in the storing unit with the first program information received by the receiver, and an output unit that outputs a broadcasting signal corresponding to the broadcasting scheduled program reserved by the reservation unit on the basis of the first program identifier in the first program information stored in the storage.

In this case, the storing unit stores the first or second program information corresponding to the broadcasting scheduled program reserved by the reservation unit, and the replacement unit replaces, when the first program information corresponding to the second program information stored in the storing unit is received by the receiver, the second program information stored in the storing unit with the received first program information.

The output unit outputs the broadcasting signal corresponding to the broadcasting scheduled program reserved by the reservation unit on the basis of the first program identifier in the first program information stored in the storage.

This makes it possible for the viewer to view or record a program corresponding to the broadcasting scheduled program on the basis of the outputted broadcasting signal.

(13)

The organization information may include a broadcasting start time, a broadcasting channel, and a program title for the broadcasting scheduled program, the receiving device may further comprise a determination unit that determines a correspondence relationship between the second program information stored in the storing unit and the first program information received by the receiver on the basis of the broadcasting start time, the broadcasting channel, and the program title for the broadcasting scheduled program, and the replacement unit may replace the second program information stored in the storing unit with the first program information received by the receiver on the basis of the correspondence relationship determined by the determination unit.

In this case, the determination unit determines the correspondence relationship between the second program information stored in the storing unit and the first program information received by the receiver on the basis of the organization information including the broadcasting start time, the broadcasting channel, and the program title for the broadcasting scheduled program. The replacement unit replaces the second program information stored in the storing unit with the received first program information on the basis of the determined correspondence relationship.

Thus, the correspondence relationship between the second program information stored in the storing unit and the first program information received by the receiver is reliably determined, and the second program information is accurately replaced with the first program information.

As a result, the viewer can accurately output a program broadcasting signal corresponding to the reserved broadcasting scheduled program and accurately view or record the program on the basis of the broadcasting signal.

(14)

The second program information may include a second program identifier for identifying the broadcasting scheduled program after the predetermined time period, the first program information corresponding to the second program information may include the second program identifier, the receiving device may further comprise a determination unit that determines a correspondence relationship between the second program information stored in the storing unit and the first program information received by the receiver on the basis of the second program identifier, and the replacement unit may replace the second program information stored in the storing unit with the first program information received by the receiver on the basis of the correspondence relationship determined by the determination unit.

In this case, the correspondence relationship between the second program information stored in the storing unit and the first program information received by the receiver is determined by the determination unit on the basis of the second program identifier.

Thus, the correspondence relationship between the second program information stored in the storing unit and the first program information received by the receiver is reliably determined, and the second program information is accurately replaced with the first program information.

As a result, the viewer can accurately output the program broadcasting signal corresponding to the reserved broadcasting scheduled program and accurately view or record the program on the basis of the broadcasting signal.

(15)

A broadcasting station apparatus according to still another aspect of the present invention is a broadcasting station apparatus that transmits a broadcasting signal including the contents of a program, including a transmitter that transmits the broadcasting signal, and a program information generator that generates first program information relating to a broadcasting scheduled program within a predetermined time period from the time of transmission of the broadcasting signal and second program information relating to a broadcasting scheduled program after the predetermined time period from the time of transmission of the broadcasting signal, the transmitter transmitting the first program information generated by the program information generator together with the broadcasting signal, the first program information including a first program identifier for identifying the broadcasting scheduled program within the predetermined time period and organization information relating to organization of the broadcasting scheduled program, the second program information including organization information relating to organization of the broadcasting scheduled program.

In the broadcasting station apparatus, the first program information and the second program information are generated by the program information generator. The first program information generated by the program information generator, together with the broadcasting signal, is transmitted by the transmitter.

Here, the first program information includes the first program identifier for identifying the broadcasting scheduled program within the predetermined time period and the organization information relating to organization of the broadcasting scheduled program, and the second program information includes the organization information relating to organization of the broadcasting scheduled program.

Consequently, the viewer can reserve not only the broadcasting scheduled program within the predetermined time period from the time of transmission of the broadcasting signal but also the broadcasting scheduled program after the predetermined time period from the time of transmission of the broadcasting signal was transmitted by using the receiving device that receives the broadcasting signal and the first program information and acquires the second program information.

(16)

The transmitter may transmit the second program information generated by the program information generator together with the broadcasting signal. In this case, the second program information generated by the program information generator, together with the broadcasting signal, is transmitted by the transmitter. This allows the receiving device to receive the second program information. Consequently, the acquisition of the second program information in the receiving device is reliably performed.

(17)

The organization information may include a broadcasting start time, a broadcasting channel, and a program title for the broadcasting scheduled program.

In this case, in the receiving device, it is possible to determine the correspondence relationship between the first and second program information on the basis of the broadcasting start time, the broadcasting channel, and the program title for the broadcasting scheduled program.

As a result, the viewer can accurately output the program broadcasting signal corresponding to the reserved broadcasting scheduled program on the basis of the first program information corresponding to the second program information relating to the broadcasting scheduled program even when he or she reserves the broadcasting scheduled program on the basis of the second program information, and accurately view or record the program on the basis of the broadcasting signal.

(18)

The second program information may include a second program identifier for identifying a broadcasting scheduled program after the predetermined time period, and the first program information corresponding to the second program information may include the second program identifier.

In this case, the second program information including the second program identifier is generated by the program information generator. The first program information including the second program identifier is generated by the program information generator in correspondence with the second program information.

This allows the correspondence relationship between the first and second program information to be determined on the basis of the second program identifier in the receiving device.

As a result, the viewer can accurately output the program broadcasting signal corresponding to the reserved broadcasting scheduled program on the basis of the first program information corresponding to the second program information relating to the broadcasting scheduled program even when he or she reserves the broadcasting scheduled program on the basis of the second program information, and accurately view or record the program on the basis of the broadcasting signal.

(19)

A broadcasting method according to still another aspect of the present invention is a broadcasting method for transmitting a broadcasting signal including the contents of a program by a broadcasting station apparatus and receiving the broadcasting signal including the contents of the program by a receiving device, including the steps of transmitting the broadcasting signal by the broadcasting station apparatus, generating first program information relating to a broadcasting scheduled program within a predetermined time period from the time of transmission of the broadcasting signal and second program information relating to a broadcasting scheduled program after the predetermined time period from the time of transmission of the broadcasting signal in the broadcasting station apparatus, transmitting the generated first program information together with the broadcasting signal by the broadcasting station apparatus, receiving the broadcasting signal and the first program information in the receiving device, acquiring the second program information in the receiving device, storing the received first program information and the acquired second program information in the receiving device, and reserving the broadcasting scheduled program on the basis of the stored first or second program information, the first program information including a first program identifier for identifying the broadcasting scheduled program within the predetermined time period and organization information relating to organization of the broadcasting scheduled program, the second program information including organization information relating to organization of the broadcasting scheduled program.

According to the broadcasting method, in the broadcasting station apparatus, the first program information relating to the broadcasting scheduled program within the predetermined time period from the time of transmission of the broadcasting signal and the second program information relating to the broadcasting scheduled program after the predetermined time period from the time of transmission of the broadcasting signal are generated. The generated first program information, together with the broadcasting signal, is transmitted.

In the receiving device, the broadcasting signal and the first program information are received, the second program information is acquired, and the received first program information and the acquired second program information are stored.

Therefore, the broadcasting scheduled program is reserved on the basis of the first program identifier for identifying the broadcasting scheduled program within the predetermined time period included in the first program information and the organization information relating to organization of the broadcasting scheduled program or the organization information relating to organization of the broadcasting scheduled program included in the second program information.

This makes it possible for the viewer to reserve not only the broadcasting scheduled program within the predetermined time period from the time of transmission of the broadcasting signal but also the broadcasting scheduled program after the predetermined time period from the time of transmission of the broadcasting signal.

(20)

The step of reserving the broadcasting scheduled program in the receiving device may include the steps of storing the first or second program information corresponding to the reserved broadcasting scheduled program in the receiving device, replacing, when the first program information corresponding to the stored second program information is received, the stored second program information with the received first program information in the receiving device, and outputting a broadcasting signal corresponding to the reserved broadcasting scheduled program on the basis of the first program identifier in the stored first program information by the receiving device.

In this case, in the receiving device, the first or second program information corresponding to the reserved broadcasting scheduled program is stored. When the first program information corresponding to the stored second program information is received, the stored second program information is replaced with the received first program information.

The broadcasting signal corresponding to the broadcasting scheduled program reserved by the reservation unit is outputted on the basis of the first program identifier in the stored first program information.

This makes it possible for the viewer to view or record the program corresponding to the broadcasting scheduled program on the basis of the outputted broadcasting signal.

Effect of the Invention

A broadcasting system, a broadcasting station apparatus, a receiving device, and a broadcasting method according to the present invention allows a viewer to reserve not only a broadcasting scheduled program within a predetermined time period from the time of transmission of a broadcasting signal but also a broadcasting scheduled program after a predetermined time period from the time of transmission of the broadcasting signal.

BRIEF DESCRIPTION OF THE DRAWINGS

FIG. 2a is a diagram showing an example of first program information on May 1 in the broadcasting system according to the first embodiment.

FIG. 2b is a diagram showing an example of second program information on May 1 in the broadcasting system according to the first embodiment.

FIG. 3a is a diagram showing an example of first program information on May 2 in the broadcasting system according to the first embodiment.

FIG. 3b is a diagram showing an example of second program information on May 2 in the broadcasting system according to the first embodiment.

FIG. 4a is a diagram showing an example of the configuration of a first packet multiplexed on a broadcasting signal in the first embodiment.

FIG. 4b is a diagram showing an example of the configuration of a second packet multiplexed on a broadcasting signal in the first embodiment.

FIG. 10 is a diagram showing an example of an image displayed on a program output device shown in FIG. 1 at the time of reservation of a future program by a viewer.

FIG. 11a is a diagram showing an example of a date tag displayed on a date retrieval screen shown in FIG. 10.

FIG. 11b is a diagram showing another example of a date tag displayed on a date retrieval screen shown in FIG. 10.

FIG. 11c is a diagram showing still another example of a date tag displayed on a date retrieval screen shown in FIG. 10.

FIG. 15 is a diagram showing an example of an image displayed on a program output device shown in FIG. 1 at the time of reservation of a future program by a viewer.

FIG. 18 is a block diagram showing the still other configuration of the broadcasting system according to the first embodiment.

FIG. 19a is a diagram showing an example of first program information on May 1 in a broadcasting system according to a second embodiment.

FIG. 19b is a diagram showing an example of second program information on May 1 in the broadcasting system according to the second embodiment.

FIG. 20a is a diagram showing an example of first program information on May 2 in the broadcasting system according to the second embodiment.

FIG. 20b is a diagram showing an example of second program information on May 2 in the broadcasting system according to the second embodiment.

FIG. 21a is a diagram showing an example of the configuration of a first packet multiplexed on a broadcasting signal in the second embodiment.

FIG. 21b is a diagram showing an example of the configuration of a second packet multiplexed on a broadcasting signal in the second embodiment.

BEST MODE FOR CARRYING OUT THE INVENTION

Figure 1:
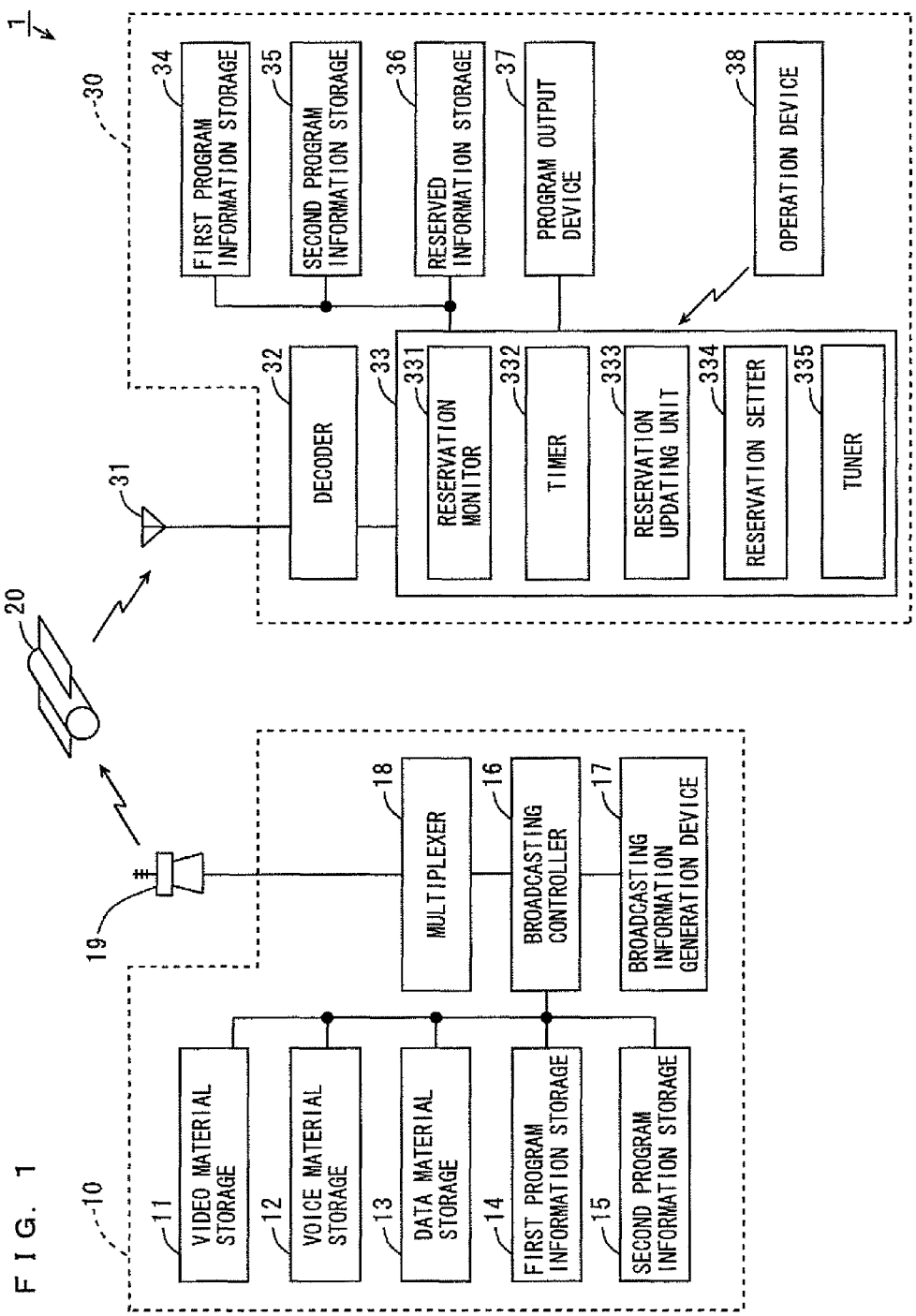
FIG. 1 is a block diagram showing the configuration of a broadcasting system according to a first embodiment.

The embodiments of the present invention will be described in detail referring to the drawings. The embodiments below describe a broadcasting system, a broadcasting station apparatus, a receiving device, and a broadcasting method.

(1) First Embodiment (a) Configuration of Broadcasting System

Description is made of a broadcasting system according to a first embodiment. FIG. 1 is a block diagram showing the configuration of the broadcasting system according to the first embodiment. As shown in FIG. 1, a broadcasting system 1 according to the present embodiment comprises a broadcasting station apparatus 10, a satellite 20, and a receiving device 30.

The broadcasting station apparatus 10 comprises a video material storage 11, a voice material storage 12, a data material storage 13, a first program information storage 14, a second program information storage 15, a broadcasting controller 16, a broadcasting information generation device 17, a multiplexer 18, and a digital broadcasting transmission antenna 19.

The video material storage 11 stores materials relating to video. The voice material storage 12 stores materials relating to voice, and the data material storage 13 stores materials relating to data (e.g., character data).

The broadcasting information generation device 17 generates a plurality of first program information and second program information, described later. The broadcasting controller 16 stores the plurality of first and second program information generated by the broadcasting information generation device 17, respectively, in the first program information storage 14 and the second program information storage 15.

Here, in the present embodiment, the video material storage 11, the voice material storage 12, the data material storage 13, the first program information storage 14, and the second program information storage 15 are storages such as a hard disk, for example. The broadcasting controller 16 is a CPU (Central Processing Unit), for example. The broadcasting information generation device 17 is a keyboard, for example.

The multiplexer 18 multiplexes the materials relating to the video, the voice, and the data and the plurality of first and second program information as a broadcasting signal. Thus, the broadcasting signal is transmitted to a receiving device 30 through the digital broadcasting transmission antenna 19 and the satellite 20 as radio waves. In the present embodiment, the broadcasting signal is composed of digital data based on MPEG (Motion Picture Expert Group) Standard, for example.

The receiving device 30 comprises a digital broadcasting receiving antenna 31, a decoder 32, a controller 33, a first program information storage 34, a second program information storage 35, a reserved information storage 36, a program output device 37, and an operation device 38. The controller 33 comprises a reservation monitor 331, a timer 332, a reservation updating unit 333, a reservation setter 334, and a tuner 335. In the present embodiment, the receiver 30 is a television receiver.

The broadcasting signal transmitted from the broadcasting station apparatus 10 is received by the digital broadcasting receiving antenna 31 in the receiver 30. The received broadcasting signal is decoded by the decoder 32. Thus, the materials relating to the video, the voice, and the data and the plurality of first and second program information are respectively separated. The controller 33 causes the plurality of first and second program information to be respectively stored in the first program information storage 34 and the second program information storage 35.

In the broadcasting system 1 according to the present embodiment, a viewer can reserve viewing or recording of a desired broadcasting scheduled program. The controller 33 causes, when the broadcasting scheduled program is reserved, information relating to the reserved broadcasting scheduled program to be stored in the reservation information storage 36. The respective operations of the units constituting the controller 33 will be described later.

In the present embodiment, the first program information storage 34, the second program information storage 35, the reservation information storage 36 are storage devices such as hard disks, for example. The controller 33 is a CPU (Central Processing Unit), for example.

The operation device 38 is a remote controller, and the program output device 37 is a display device such as a cathode ray tube, a liquid crystal display panel, or a plasma display panel.

(b) Details of First and Second Program Information

In the broadcasting system 1 according to the present embodiment, each of the plurality of first and second program information is information relating to a broadcasting scheduled program. Consequently, the contents of the first and second program information are changed with an elapse of the date of transmission of the broadcasting signal. The details of the first and second program information will be described on the basis of the first and second program information on May 1 and May 2 as an example.

FIGS. 2 and 3 are diagrams showing examples of the first and second program information that are changed with an elapse of the date of transmission of the broadcasting signal in the broadcasting system 1 according to the first embodiment.

FIG. 2a shows an example of the first program information on May 1, and FIG. 2b shows an example of the second program information on May 1. FIG. 3a shows an example of the first program information on May 2, and FIG. 3b shows an example of the second program information on May 2.

In the present embodiment, the first program information is information relating to each of broadcasting scheduled programs within a predetermined time period from the date of transmission of the broadcasting signal by the broadcasting station apparatus 10. In this example, the organization of all the broadcasting scheduled programs corresponding to eight days from the date of transmission of the broadcasting signal shall be determined before the date of transmission of the broadcasting signal. The broadcasting scheduled program whose organization has been determined within the predetermined time period from the date of transmission of the broadcasting signal is referred to as a defined program.

As shown in FIGS. 2a and 3a, a "program identifier", a "channel", a "broadcasting start time", a "program title", and a "genre" are associated with the defined program in the first program information.

The "program title" is the title of each of the defined programs, and the "broadcasting start time" is the time when the defined program is scheduled to start. The "channel" is a channel on which the defined program is broadcast, and the "genre" indicates the classification of the defined program. The "program identifier" is a number for identifying the defined program. Consecutive numerals are given to the "program identifiers" for a plurality of defined programs for channels in the order of the "broadcasting start time".

The broadcasting scheduled program whose organization has been determined out of the broadcasting scheduled programs in the future after a predetermined time period from the date of transmission of the broadcasting signal is referred to as a future program.

In the present embodiment, the second program information is information relating to each of future programs. As shown in FIGS. 2b and 3b, a "channel", a "broadcasting start time", and a "program title" are associated with the future program in the second program information. In the second program information, a "program identifier" is not thus given to each of the future programs.

Here, the contents of the first and second program information are changed with an elapse of the date of transmission of the broadcasting signal, as described above. That is, the information relating to each of the defined programs from May 1 to May 8 is the first program information at the time point of May 1 (see FIG. 2a), and the information relating to each of the defined programs from May 2 to May 9 is the second program information at the time point of May 2 (see FIG. 3a).

The information relating to each of the future programs on May 9 and later is the second program information at the time point of May 1 (see FIG. 2b), and the information relating to each of the defined programs on May 10 and later is the second program information at the time point of May 2 (see FIG. 3b).

Thus, the information relating to the future program on May 9 (see an arrow Y in FIG. 2b, for example) that is the second program information at the time point of May 1 is the first program information as information relating to the defined program at the time point of May 2 (see an arrow Z in FIG. 3a, for example), as shown in FIGS. 2b and 3b.

Although in the present embodiment, the plurality of first and second program information are generated by the broadcasting information generation device 17 and are transmitted to the receiving device 30, the number of first program information generated by the broadcasting information generation device 17 may be one, or the number of second program information generated by the broadcasting information generation device 17 may be also one.

Although in the present embodiment, the contents of the first and second program information are changed with an elapse of the date of transmission of the broadcasting signal, the contents of the first and second program information may be transmitted every time the contents of the first and second program information are changed.

(c) Method of Transmitting First and Second Program Information

As described above, each of the plurality of first and second program information is multiplexed as a broadcasting signal by the multiplexer 18 shown in FIG. 1, and is transmitted to the receiver 30 from the broadcasting station apparatus 10. In this case, the first program information is multiplexed on the broadcasting signal as a first packet, and the second program information is multiplexed thereon as a second packet.

FIG. 4 is a diagram showing an example of the respective configurations of the first and second packets multiplexed on the broadcasting signal in the first embodiment. FIG. 4a shows a first packet PA1, and FIG. 4b shows a second packet PA2.

The first packet PA1 shown in FIG. 4a includes a "first flag", a "program identifier", a "channel", a "broadcasting start time", a "program title", and a "genre" in this order.

The second packet PA2 shown in FIG. 4b includes a "second flag", a "channel", a "broadcasting start time", and a "program title" in this order.

The above-mentioned "first flag" indicates that the subsequent information is the first program information. The "second flag" indicates that the subsequent information is the second program information. This allows the receiving device 30 to respectively identify the first and second program information in the broadcasting signal by the "first flag" and the "second flag".

Figure 5:
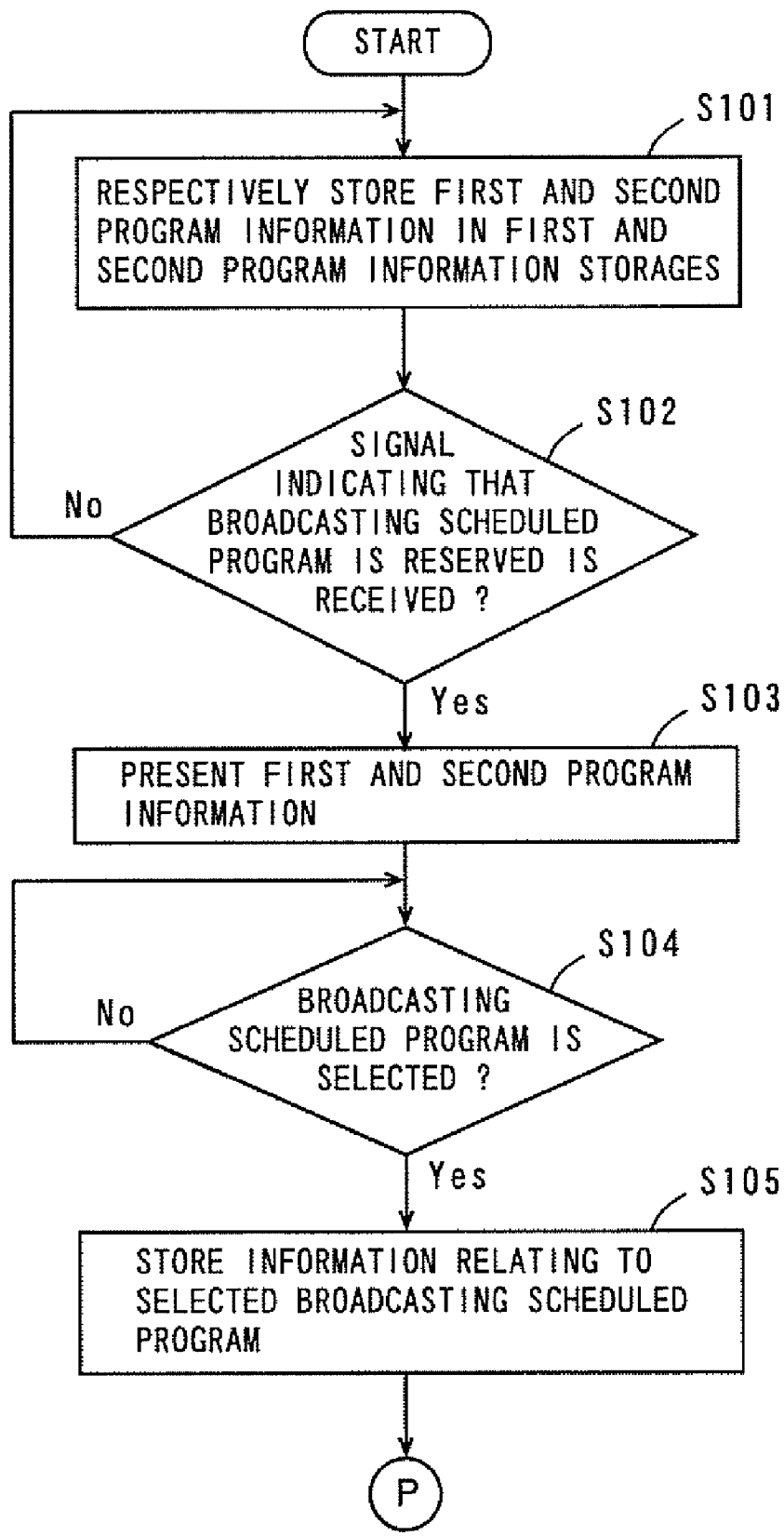
FIG. 5 is a flow chart showing the operation of a controller at the time of reservation of a defined program and a future program.
Figure 6:
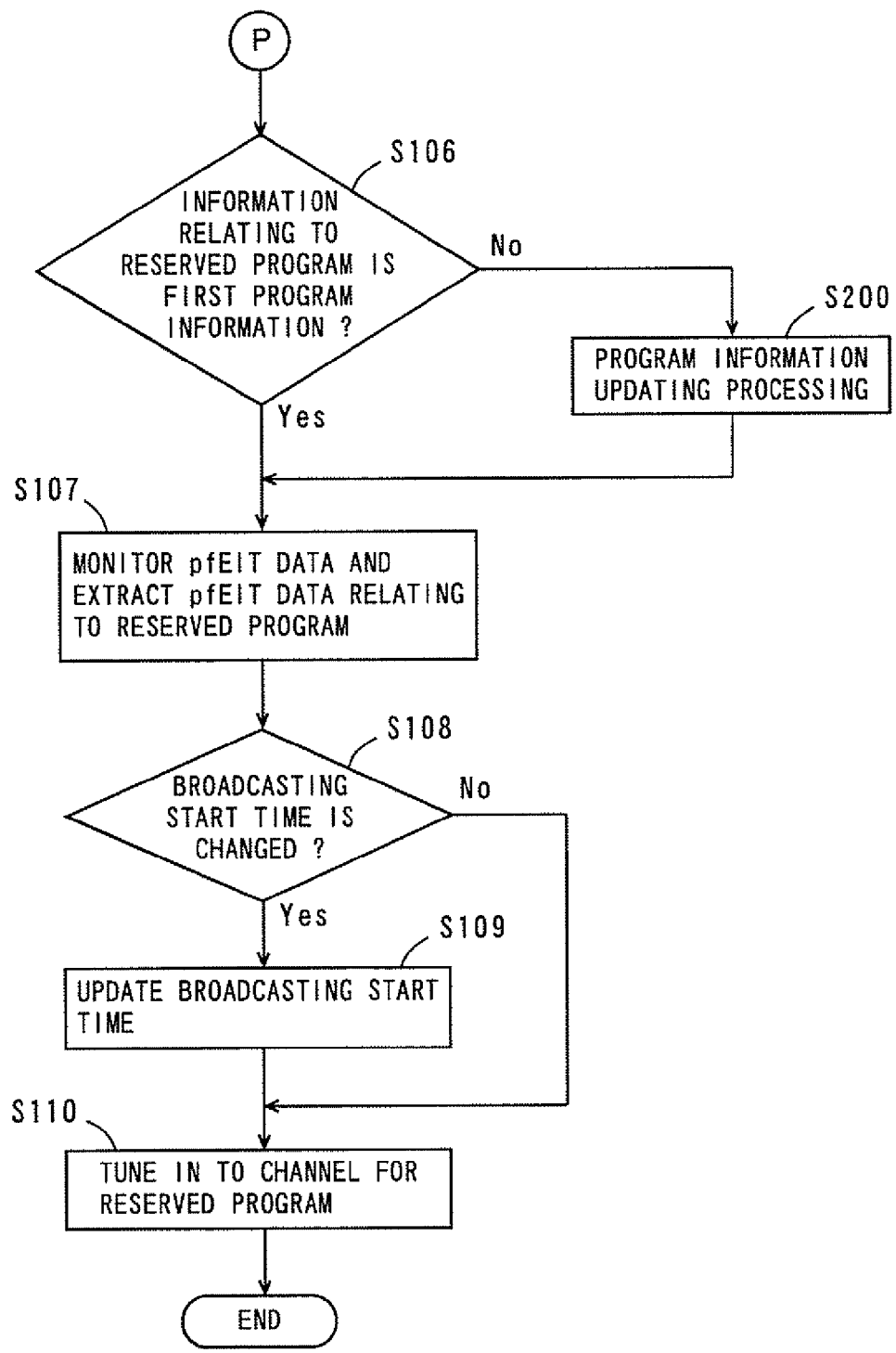
FIG. 6 is a flow chart showing the operation of a controller at the time of reservation of a defined program and a future program.

(d) Operation of Controller in Receiving Device at the Time of Reservation of Defined Program and Future Program The operations of the controller 33 in the receiving device 30 shown in FIG. 1 will be described on the basis of FIGS. 1 to 7. FIGS. 5 and 6 are flow charts showing the operations of the controller 33 at the time of reservation of a defined program and a future program.

(d-1) Step S101

First, the controller 33 in the receiving device 30 (FIG. 1) respectively identifies and extracts the first and second program information on the basis of the "first flag" and the "second flag" from the received broadcasting signal. Thus, the controller 33 causes the first program information storage 34 and the second program information storage 35 shown in FIG. 1 to respectively store the first and second program information (step S101).

(d-2) Specific Example of Step S101

In a case where the date of transmission of the broadcasting signal is May 1, for example, the plurality of first program information (information relating to defined programs) shown in FIG. 2a are stored in the first program information storage 34. Further, the plurality of second program information (information relating to future programs) shown in FIG. 2b are stored in the second program information storage 35.

On the other hand, in a case where the date of transmission of the broadcasting signal is May 2, the plurality of first program information shown in FIG. 3a are stored in the first program information storage 34. Further, the plurality of second program information shown in FIG. 3b are stored in the second program information storage 35.

(d-3) Step S102

The controller 33 then determines whether or not a signal indicating that a broadcasting scheduled program is reserved is received from the operation device 38 (step S102). The controller 33 repeats the operations in the steps S101 and S102 when it does not receive the signal indicating that a broadcasting scheduled program is reserved.

(d-4) Step S103

On the other hand, the controller 33 outputs the plurality of first and second program information stored in the first program information storage 34 and the second program information storage 35 to the program output device 37 shown in FIG. 1 when it receives the signal indicating that a broadcasting scheduled program is reserved. Thus, the controller 33 causes the program output device 37 to present the plurality of first and second program information to the viewer (step S103).

That is, the program output device 37 respectively presents the plurality of first and second program information to the viewer when the plurality of first and second program information are inputted. This allows the viewer to confirm the first and second program information.

(d-5) Specific Example of Step S103

When the viewer reserves a defined program at the time point of May 1, for example, the plurality of first program information (information relating to defined programs) shown in FIG. 2a are presented to the viewer by the program output device 37. A specific example of the presenting method will be described later.

When the viewer reserves a future program at the time point of May 1, the plurality of second program information (information relating to future programs) shown in FIG. 2b are presented to the viewer by the program output device 37. A specific example of the presenting method will be described later.

(d-6) Step S104

Then, the controller 33 determines whether a broadcasting scheduled program is selected from the presented plurality of first and second program information by the operation device 38 (step S104).

(d-7) Specific Example of Step S104

For example, the viewer can select a broadcasting scheduled program from the plurality of defined programs shown in FIG. 2a at the time point of May 1. Further, the viewer can select a broadcasting scheduled program from the plurality of future programs shown in FIG. 2b at the time point of May 1.

(d-3) Step S105

The controller 33 performs, when the broadcasting scheduled program is selected, the operation of reserving the selected broadcasting scheduled program. That is, the reservation setter 334 in the controller 33 (FIG. 1) extracts information relating to the broadcasting scheduled program selected from the plurality of first and second program information and stores the extracted information in the reservation information storage 36 shown in FIG. 1 (step S105). The reserved broadcasting scheduled program is hereinafter referred to as a reserved program.

(d-9) Specific Example of Step S105

In a case where a defined program "Ancient People" (see an arrow X in FIG. 2a) is selected at the time point of May 1, first program information comprising "program title: Ancient People", "broadcasting start time: 20:00 on May 8", "channel: 100", "genre: Documentary Report", and "program identifier: 2129", together with a first flag, is stored in the reservation information storage 36 as information relating to a reserved program.

In a case where a future program "Live Broadcast of World Cup Sports" (see an arrow Y in FIG. 2b) is selected at the time point of May 1, second program information comprising "program title: Live Broadcast of World Cup Sports", "broadcasting start time: 20:00 on May 9", and "channel: 100", together with a second flag, is stored in the reservation information storage 36 as information relating to a reserved program.

(d-10) Step S106

Thereafter, the reservation updating unit 333 in the controller 33 (FIG. 1) determines whether or not the information relating to the reserved program stored in the reservation information storage 36 is first program information (step S106).

The reservation updating unit 333 performs the determination operation on the basis of a first or second flag included in the information relating to the reserved program. Thus, it is determined whether or not the reserved program is a definite program or a future program.

The reservation updating unit 333 may perform the determination operation on the basis of determination whether or not there is a "program identifier" in the information relating to the reserved program. In this case, the information relating to the reserved program including a "program identifier" is determined as information relating to a defined program. The information relating to the reserved program including no "program identifier" is determined as information relating to a future program.

(d-11) Description of pfEIT Data

Here, in the broadcasting system 1 according to the present embodiment, pfEIT (present following Event Information Table) data is transmitted from the broadcasting station apparatus 10 to the receiving device 30 as needed. The pfEIT data represents information relating to a program that is being currently broadcast and a program that will be next broadcast.

In the pfEIT data, a "channel", a "broadcasting start time", and a "program identifier" are associated with each of the programs that are being currently broadcast and will be next broadcast.

(d-12) Step S107

The reservation monitor 331 in the controller 33 (FIG. 1) monitors, when the information relating to the reserved program is first program information (information relating to a defined program), pfEIT data on the basis of the information relating to the reserved program ("program title", "broadcasting start time", "channel", "genre", "program identifier", etc.), and extracts pfEIT data relating to the reserved program (step S107).

In this case, the reservation monitor 331 performs monitoring as to whether or not pfEIT data including the same "channel" and "program identifier" as the "channel" and the "program identifier" for the reserved program stored in the reservation information storage 36 is received. Thus, the reservation monitor 331 extracts the pfEIT data including the information relating to the reserved program.

(d-13) Specific Example of Step S107

In a case where information relating to the defined program "Ancient People" (see the arrow X in FIG. 2a) broadcast on May 8 is stored in the reserved information storage 36 as information relating to a reserved program at the time point of May 1, for example, the reservation monitor 331 extracts pfEIT data including "broadcasting start time: 20.00 on May 8" and "program identifier: 2129" for the reserved program.

(d-14) Step S108

Therefore, the reservation monitor 331 determines whether or not the "broadcasting start time" for the reserved program stored in the reservation information storage 36 and the "broadcasting start time" for the reserved program included in the pfEIT data coincide with each other.

In other words, it is determined whether or not the "broadcasting start time" for the reserved program at the time of actual broadcasting is changed from the "broadcasting start time" for the reserved program set at the time of reservation (step S108).

(d-15) Step S109

The reservation monitor 331 in the controller 33 updates, when the "broadcasting start time" for the reserved program is changed, the "broadcasting start time" in the information relating to the reserved program stored in the reservation information storage 36 by the "broadcasting start time" for the reserved program included in the pfEIT data (step S109). On the other hand, the reservation monitor 331 maintains, when the "broadcasting start time" for the reserved program is not changed, the information relating to the reserved program stored in the reservation information storage 36.

(d-16) Step S110

Finally, the tuner 335 in the controller 33 tunes in to the "channel" for the reserved program at the "broadcasting start time" for the reserved program on the basis of the current time measured by the timer 332 (FIG. 1) (step S110). Thus, the reserved program that is being broadcast is reproduced by the program output device 37.

According to the operations in the foregoing steps S107 to S109, even in a case where the "broadcasting start time" for the reserved program has been changed from the time point of the reservation to the time of actual broadcasting, the operation for reserving the reserved program is reliably performed depending on the changed "broadcasting start time".

(d-17) Step S200

In the foregoing step S106, the reservation updating unit 333 in the controller 33 (FIG. 1) performs program information updating processing, described below, when the information relating to the reserved program is second program information (information relating to a future program) (step S200).

(d-18) Step S201

Figure 7:
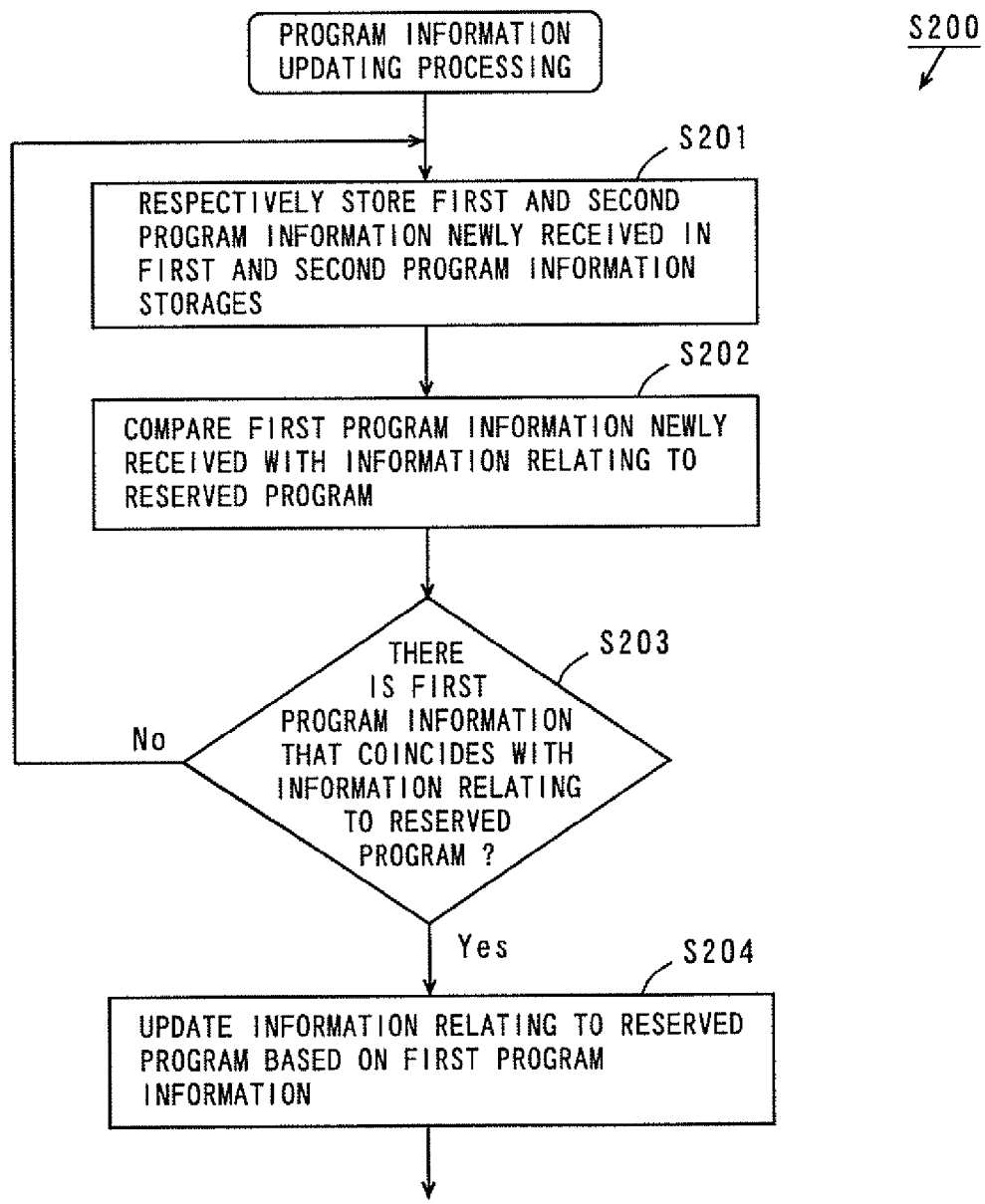
FIG. 7 is a flow chart showing program information updating processing by a controller shown in FIG. 1.

FIG. 7 is a flow chart showing the program information updating processing by the controller 33 shown in FIG. 1. As shown in FIG. 7, the controller 33 causes the first program information storage 34 and the second program information storage 35 to respectively store a plurality of first and second program information newly received in the same manner as the operation in the foregoing step S101 (step S201).

(d-19) Specific Example of Step S201

Here, the future program "Live Broadcast of World Cup Sports" at the time point of May 1 (see the arrow Y in FIG. 2b) and the defined program "program title: Special Live Broadcast of World Cup Sports" at the time point of May 2 (see the arrow Z in FIG. 3a) are programs having the same contents.

In this case, at the time point of May 1, information relating to the future program "Live Broadcast of World Cup Sports" ("program title: Live Broadcast of World Cup Sports", "broadcasting start time: 20:00 on May 9", and "channel: 100") is stored in the second program information storage 35 as the second program information by the operation in the step S101 of the controller 33.

Thereafter, at the time point of May 2, information relating to the defined program "Special Live Broadcast of World Cup Sports" newly received ("program title: Special Live Broadcast of World Cup Sports", "broadcasting start time: 20:00 on May 9", "channel: 100", "genre: Sports", and "program identifier: 2158") is stored in the first program information storage 34 as the first program information by the operation in the step S201 of the controller 33.

(d-20) Step S202

Then, the reservation updating unit 333 in the controller 33 (FIG. 1) compares the information relating to the reserved program with a plurality of first program information newly received from the broadcasting station apparatus 10 (step S202).

(d-21) Specific Example of Step S202

In this example, the reservation updating unit 333 compares a plurality of first program information (information relating to defined programs) newly stored in the first program information storage 34 on May 2 with information relating to a reserved program stored in the reservation information storage 36 on May 1.

(d-22) Step S203

Then, the reservation updating unit 333 determines whether or not the plurality of first program information newly received include first program information that coincides with the information relating to the reserved program stored in the reservation information storage 36 (step S203).

The determination operation is performed by comparing the "program start time", the "channel", and the "program title" that are associated with the reserved program with a "broadcasting start time", a "channel", and a "program title" that are associated with a defined program in the first program information newly received.

That is, the reservation updating unit 333 determines whether or not the plurality of first program information newly received include information relating to a defined program that coincides in a broadcasting start time" and a "channel" with the information relating to the reserved program stored in the reservation information storage 36 and coincides therewith in at least a part of a "program title".

Thus, the reservation updating unit 333 considers, when the information relating to the defined program exists in the plurality of first program information newly received, the defined program associated with the first program information to be the same as the reserved program.

(d-23) Specific Example of Step S203

In this example, the reserved program with which "program title: Live Broadcast of World Cup Sports", "broadcasting start time: 20:00 on May 9", and "channel: 100" that are stored in the reservation information storage 36 are associated and the defined program (see the arrow Z in FIG. 3a) with which "program title: Special Live Broadcast of World Cup Sports", "broadcasting start time: 20.00 on May 9", and "channel: 100" are associated in the first program information at the time point of May 2 are considered to be the same.

(d-24) Step S204

The reservation updating unit 333 in the controller 33 updates, when there is first program information that coincides with the information relating to the reserved program, the information relating to the reserved program stored in the reservation information storage 36 on the basis of the first program information (step S204). Thereafter, the reservation monitor 331 in the controller 33 performs the operation in the foregoing step S107.

On the other hand, the controller 33 repeats the operations in the steps S201 to S203 when there is no first program information that coincides with the information relating to the reserved program.

(d-25) Specific Example of Step S204

In this example, the reservation updating unit 333 updates the information relating to the reserved program stored in the reservation information storage 36 by the first program information comprising a "program title", a "broadcasting start time", a "channel", and a "genre", and a "program identifier".

Thus, on May 2, the information relating to the reserved program based on the second program information stored in the reservation information storage 36 at the time point of May 1 is updated by "program title: Special Live Broadcast of World Cup Sports", "broadcasting start time: 20:00 on May 9", "channel: 100", "genre: sports", and "program identifier: 2158" on the basis of the first program information that coincides with the information relating to the reserved program (see the arrow Z in FIG. 3a).

(d-26) Effect

In the broadcasting system 1 according to the present embodiment, the plurality of second program information are thus transmitted to the receiving device 30 from the broadcasting station apparatus 10, so that the viewer can reserve not only the defined program within the predetermined time period from the date of transmission of the broadcasting signal but also the future program after the predetermined time period from the date of transmission of the broadcasting signal.

(d-27) Another Modified Example

Although in the present embodiment, the controller 33 monitors the pfEIT data in the step S107, the controller 33 may monitor first program information continuously received from the broadcasting station apparatus 10.

In this case, the controller 33 (the reservation monitor 331) compares a "broadcasting start time" for a reserved program stored in the reservation information storage 36 with the current time measured by the timer 332. Thus, the controller 33 tunes in to a "channel" for the reserved program when the current time comes closer to the "broadcasting start time" for the reserved program (e.g., one minute before).

The controller 33 extracts, out of a plurality of first program information continuously received, the first program information (information relating to defined programs) that coincide in a "channel" with the reserved program. The controller 33 further extracts, out of the extracted first program information, the first program information that coincide in a "program identifier" with the reserved program on the basis of a "program identifier" for the reserved program.

Thus, the controller 33 determines whether or not the "broadcasting start time" for the reserved program is changed, as in the step S108. The controller 33 updates, when the "broadcasting start time" for the reserved program is changed, the "broadcasting start time" in the information relating to the reserved program stored in the reservation information storage 36 by a "broadcasting start time" in the extracted first program information.

On the other hand, the controller 33 maintains, when the "broadcasting start time" for the reserved program is not changed, the "broadcasting start time" for the reserved program stored in the reservation information storage 36.

The operation of the controller 33 in the step 110 is not limited to the foregoing. When the receiving device 30 comprises a storage that causes recording media such as a video tape, a DVD (digital versatile disk), and a HD (hard disk) to store information, for example, the controller 33 may record the reserved program on the recording media at the "broadcasting start time" for the reserved program.

(e) Procedure for Reservation of Future Program by Viewer and Example of Screen

Description is made of the procedure for reservation in a case where a viewer reserves the future program in the broadcasting system 1 according to the present embodiment.

Figure 8:
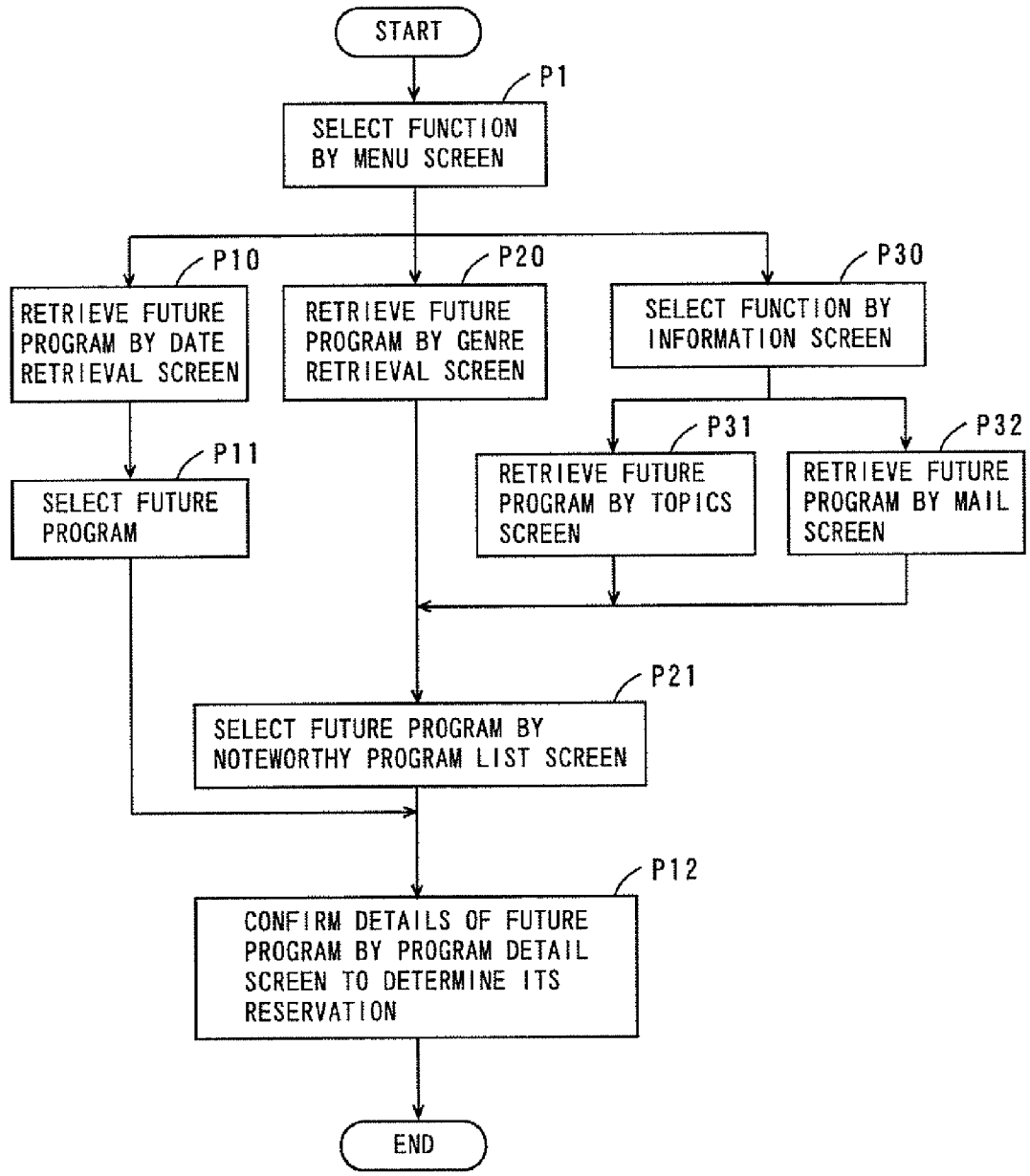
FIG. 8 is a flow chart showing the procedure for reservation in a case where a viewer reserves a future program in the broadcasting system according to the first embodiment.

FIG. 8 is a flow chart showing the procedure for reservation in a case where a viewer reserves the future program in the broadcasting system 1 according to a first embodiment. FIG. 9 to FIG. 16 are diagrams showing examples of images displayed on the program output device 37 shown in FIG. 1 when the viewer reserves the future program.

Figure 9:
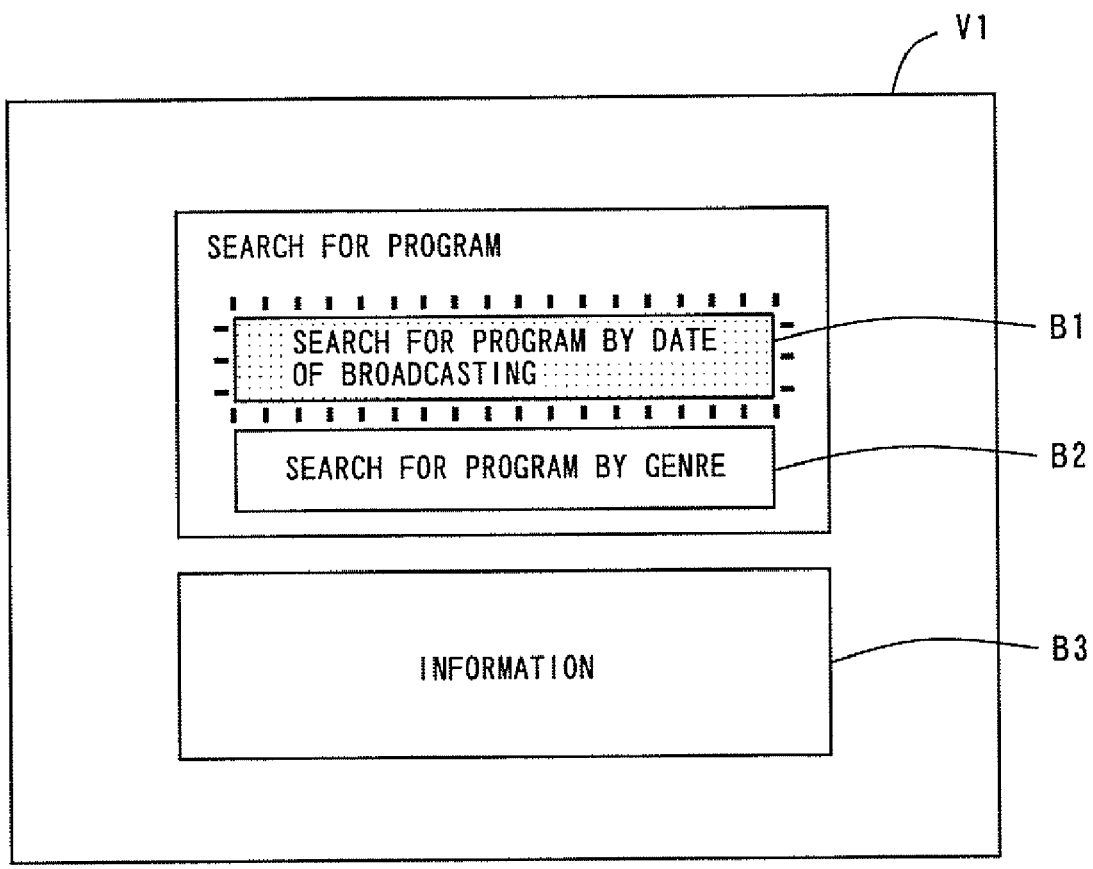
FIG. 9 is a diagram showing an example of an image displayed on a program output device shown in FIG. 1 at the time of reservation of a future program by a viewer.

In a case where the future program is reserved, the viewer operates the operation device 38 shown in FIG. 1, to cause the program output device 37 to display a menu screen on which various functions of the receiving device 30 are displayed. FIG. 9 shows an example of the menu screen.

In the example shown in FIG. 9, three function selection buttons B1, B2, and B3 respectively corresponding to "search for program by date of broadcasting", "search for program by genre", and "information" are displayed on a menu screen V1.

The function selection buttons B1, B2, and B3 respectively correspond to the function of retrieving a future program on the basis of a date of broadcasting, the function of retrieving a future program on the basis of a genre, and the function of displaying information toward a viewer.

The viewer operates the operation device 38, to select any one of the three function selection buttons B1 to B3 (step P1). As shown in FIG. 9, when the function selection buttons B1 to B3 are selected, the selected function selection button B1 is highlight-displayed.

When the viewer selects the function selection button B1, a date retrieval screen is displayed on the program output device 37. FIG. 10 shows an example of the date retrieval screen. Therefore, the viewer retrieves a desired future program by a date retrieval screen V2 (step P10).

An example of the date retrieval screen V2 will be then described. As shown in FIG. 10, the date retrieval screen V2 comprises a video display region r1, a date display region r2, a program listing display region r3, and a heading display region r4.

A program on a channel that is being currently turned in to by the viewer, for example, is displayed in the video display region r1. Further, an advertisement or the like is displayed therein.

A date tag DT1 is displayed in the date display region r2. This allows the viewer to select a desired date by operating the operation device 38.

A program listing on the date selected by the viewer on the basis of a plurality of first or second program information is displayed in the program listing display region r3. Therefore, the viewer can select each of programs displayed by operating the operation device 38. In this case, the program selected by the viewer is highlight-displayed.

Information relating to the program selected by the viewer is displayed in the heading display region r4.

The date tag DT1 will be described. FIG. 11a shows the date tag DT1. As shown in FIG. 11a, dates for eight days from the current date (May 1 in this example) are highlight-displayed in the date tag DT1.

The display of the highlighted dates for eight days indicates that the viewer can reserve, out of defined programs, the program, for example. Consequently, the viewer can reserve a future program by selecting the date that is not highlighted (May 9 or later in the example shown in FIG. 10).

The viewer selects the desired date (e.g., May 9), so that the selected date is highlight-displayed.

The date tag displayed in the date display region r2 is not limited to that in the foregoing example. For example, a date tag DT2 shown in FIG. 11b or a date tag DT3 shown in FIG. 11c may be displayed in the date display region r2.

In the date tag DT2 shown in FIG. 11b, dates for eight days are displayed, and date display change buttons B11, B12, B13, and B14 are displayed.

The viewer can select the date display change buttons B11, B12, B13, and B14 to change the date displayed in the date tag DT2 by operating the operation device 38. In the date tag DT2, the date selected by the viewer is also highlight-displayed.

The date tag DT3 shown in FIG. 11c has a week display frame WC and a date display frame DC. A date at the head of each week (e.g., a date on Sunday) is displayed in the week display frame WC. Dates for seven days in a week selected within the week display frame WC are displayed in the date display frame DC.

The viewer can select the desired week in the week display frame WC to select a desired date in the date display frame DC. In the date tag DT3, the dates selected by the viewer within the week display frame WC and the date display frame DC are respectively highlight-displayed.

In the above-mentioned manner, the viewer selects a desired future program from the date retrieval screen V2 shown in FIG. 10 (step P11).

Figure 12:
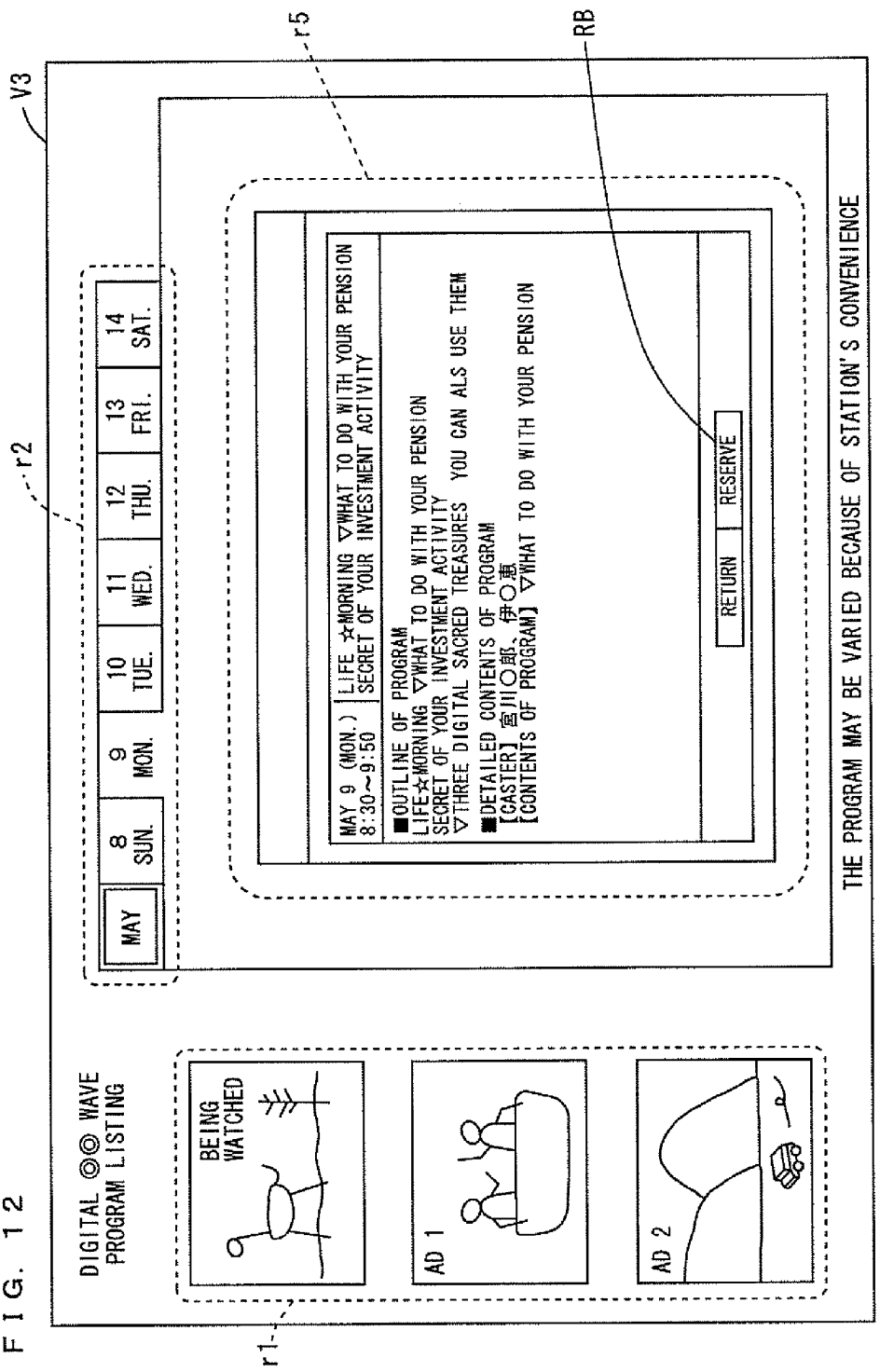
FIG. 12 is a diagram showing an example of an image displayed on a program output device shown in FIG. 1 at the time of reservation of a future program by a viewer.

The viewer can confirm the details of the selected future program by operating the operation device 38. In this case, a program detail screen is displayed on the program output device 37. FIG. 12 shows an example of the program detail screen.

A program detail screen V3 comprises a video display region r1, a date display region r2, and a detailed information display region r5. In the detailed information display region r5, detailed information relating to a future program selected by the viewer is displayed.

Detailed information relating to such a broadcasting scheduled program is associated as "additional information" with each of a plurality of first and second program information, which is not described in the foregoing.

Therefore, the viewer confirms the detailed information relating to a desired future program, and selects a reservation button RB to determine the reservation thereof (step P12).

Figure 13:
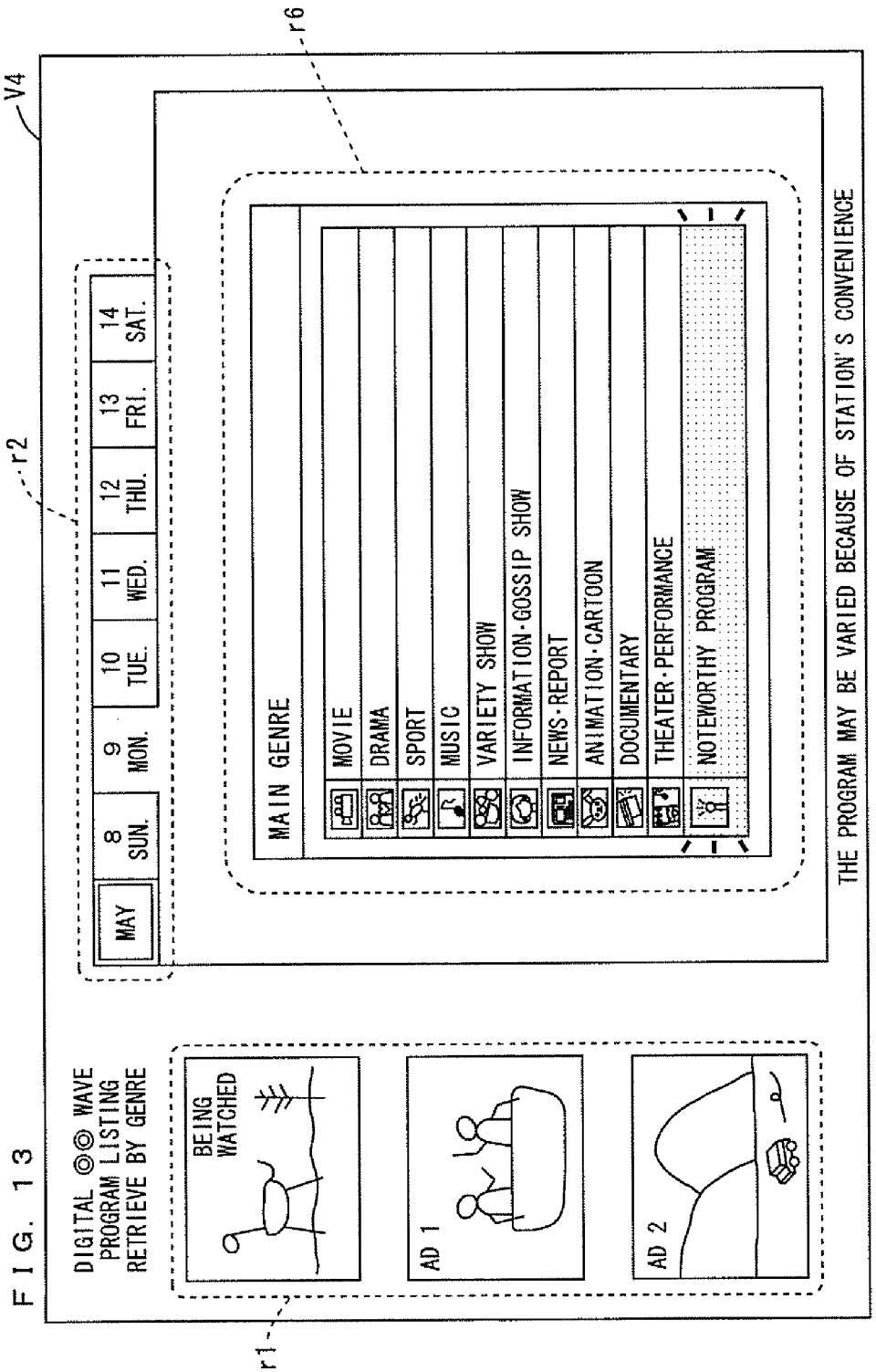
FIG. 13 is a diagram showing an example of an image displayed on a program output device shown in FIG. 1 at the time of reservation of a future program by a viewer.

When the viewer determines the function selection button B2 shown in FIG. 9 in the foregoing step P1, a genre retrieval screen is displayed on the program output device 37. FIG. 13 shows an example of the genre retrieval screen. Thus, the viewer retrieves a desired future program by a genre retrieval screen V4 (step P20).

The genre retrieval screen V4 comprises a video display region r1, a date display region r2, and a genre display region r6. Genres of programs are displayed in the genre display region r6. In the example shown in FIG. 13, "movie", "dram", "sport", "noteworthy program", and so on are displayed as the genres of programs.

Here, "genres" are respectively associated with information relating to defined programs in each of the plurality of first program information, as described above. Consequently, the viewer can select a desired "genre", to display on the program output device 37 the defined programs with which the "genre" is associated as a list On the other hand, "genres" are not respectively associated with information relating to future programs in each of the plurality of second program information. In the present embodiment, however, the future programs are classified into the genre "noteworthy program". On the genre retrieval screen V4, the genre of the selected program is highlight-displayed.

Figure 14:
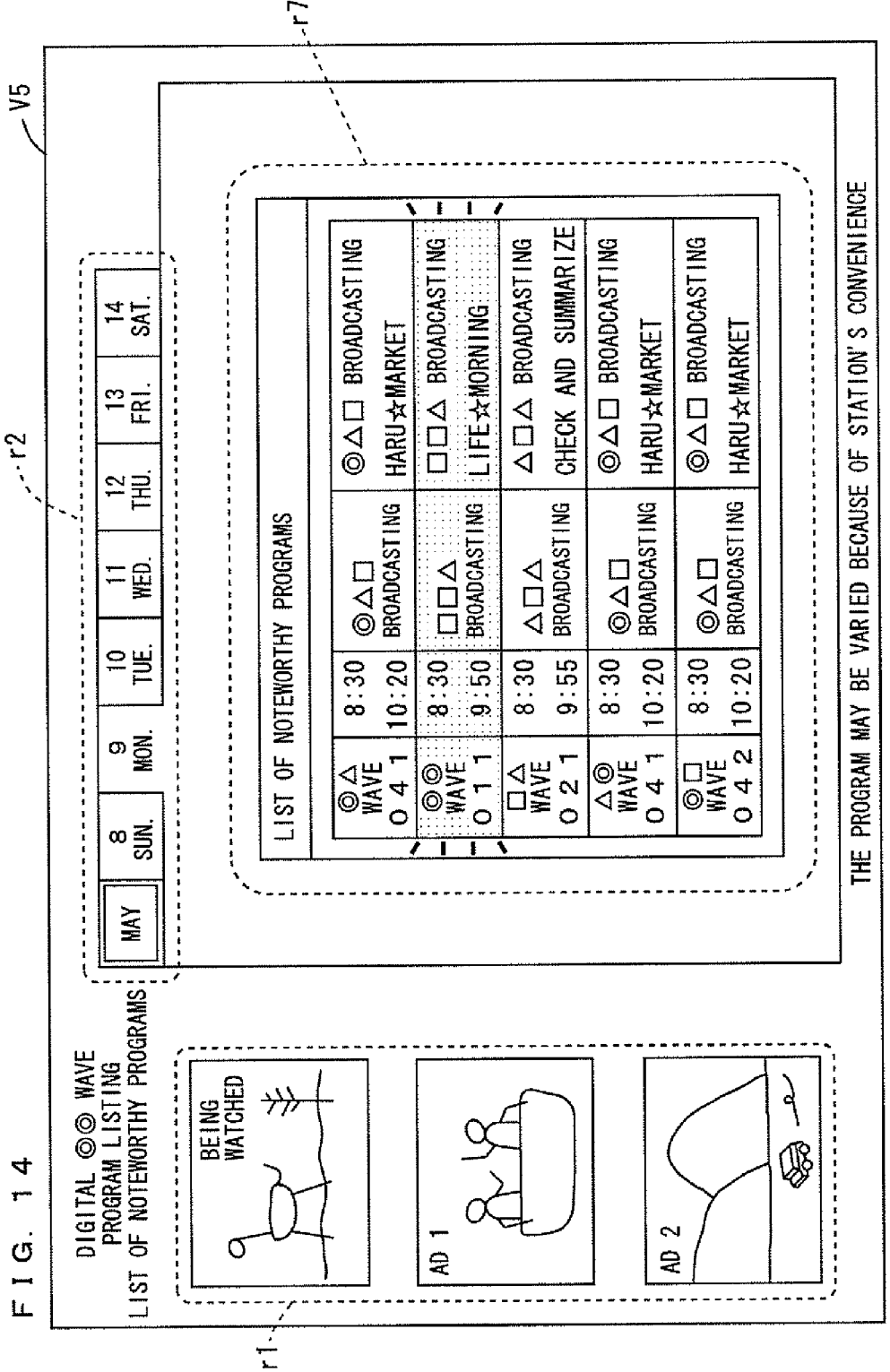
FIG. 14 is a diagram showing an example of an image displayed on a program output device shown in FIG. 1 at the time of reservation of a future program by a viewer.

When the viewer selects the genre "noteworthy program", a noteworthy program list screen is displayed on the program output device 37. FIG. 14 shows an example of the noteworthy program list screen.

A noteworthy program list screen V5 includes a video display region r1, a date display region r2, and a noteworthy program list display region r7. A list of future programs is displayed in the noteworthy program list display region r7. In this list, a "broadcasting start time" and a "program title", and so on are displayed for each of the future programs.

A viewer selects the desired future program from the noteworthy program list display region r7 on the noteworthy program list screen V5 (step P21).

Thereafter, the program detail screen V3 shown in FIG. 12 is displayed on the program output device 37. Therefore, the viewer confirms detailed information relating to the future program, and selects the reservation button RB to determine the reservation thereof, as in the step P12.

In the foregoing step P1, when the viewer selects the function selection button B3 shown in FIG. 9, an information screen is displayed on the program output device 37. FIG. 15 shows an example of the information screen. The viewer retrieves a desired future program by an information screen V6 (step P30).

In the example shown in FIG. 15, two function selection buttons B4 and B5 "display topics" and "display mail" are displayed on the information screen V6.

The function selection buttons B4 and B5 respectively correspond to the function of displaying topics toward a viewer and the function of displaying a mail toward a viewer.

The viewer operates the operation device 38, to select either one of the two function selection buttons B4 and B5 (step P30).

Figure 16A:
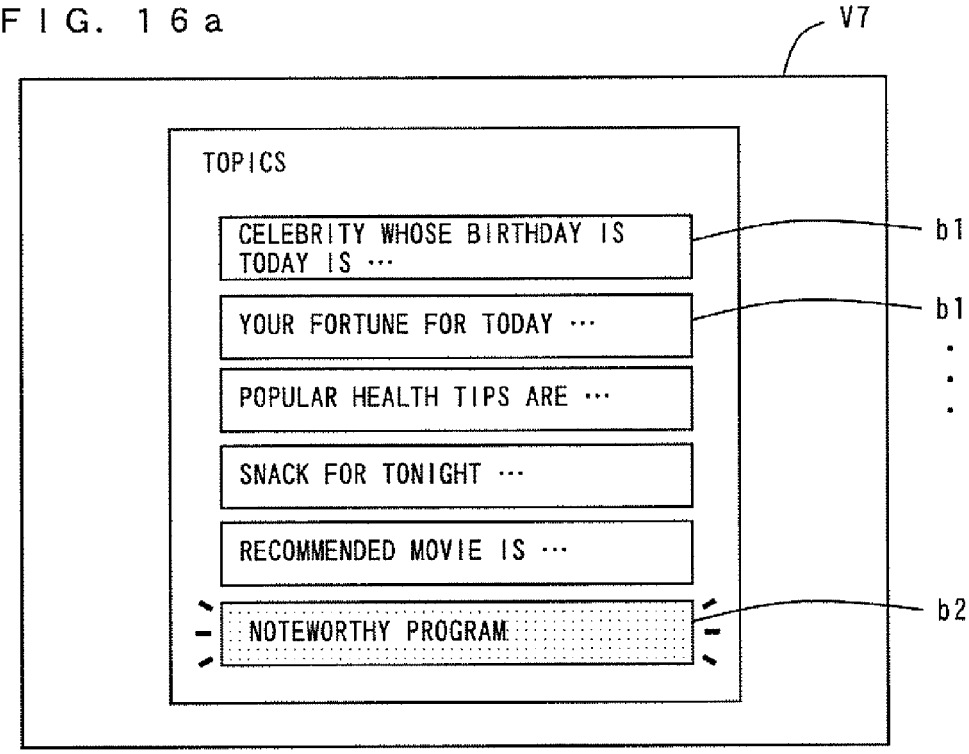
FIG. 16a is a diagram showing an example of a topics screen displayed on a program output device shown in FIG. 1 at the time of reservation of a future program by a viewer.

When the viewer selects the function selection button B4, a topics screen is displayed on the program output device 37. FIG. 16a shows an example of the topics screen.

On a topics screen V7 shown in FIG. 16a, a plurality of selection buttons b1 for respectively displaying a plurality of topics on the program output device 37 and a noteworthy program button b2 for displaying the noteworthy program list screen V5 shown in FIG. 14 on the program output device 37 are displayed.

The viewer selects the noteworthy program button b2, to retrieve a future program (step P31). Thereafter, the viewer determines the reservation of a desired future program in the same procedure as that in the foregoing steps P21 and P12.

Figure 16B:
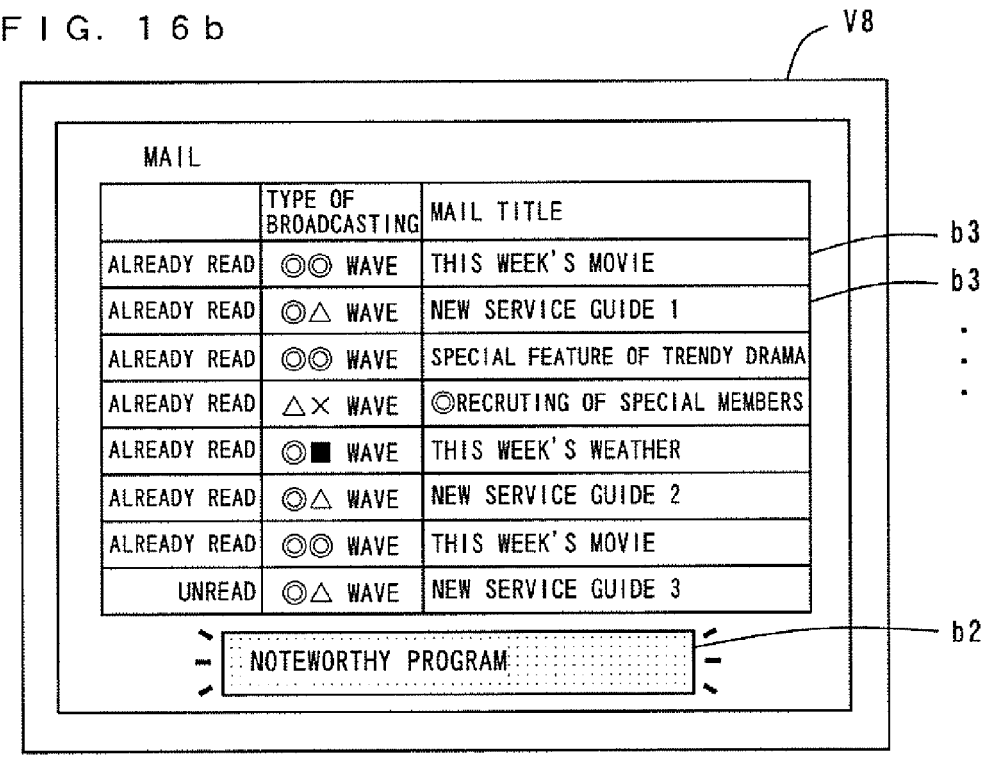
FIG. 16b is a diagram showing an example of a mail screen displayed on a program output device shown in FIG. 1 at the time of reservation of a future program by a viewer.

When the viewer selects the function selection button B5, a mail screen is displayed on the program output device 37. FIG. 16b shows an example of the mail screen.

On a mail screen V8 shown in FIG. 16b, a plurality of selection buttons b3 for respectively displaying a plurality of mails on the program output device 37 and the above-mentioned noteworthy program button b2 are displayed.

The viewer selects the noteworthy program button b2, to retrieve a future program (step P32). Thereafter, the viewer determines the reservation of a desired future program in the same procedure as that in the foregoing steps S21 and P12.

In the receiving device 30 in the broadcasting system 1 according to the present embodiment, the viewer can reserve the desired future program by operating the screen displayed on the program output device 37 in various procedures.

(f) Another Example of Operation for Comparing Reserved Program and Defined Program at the Time of Program Information Updating Processing As described in the foregoing, the reservation updating unit 333 in the controller 33 shown in FIG. 1 determines whether or not a plurality of first program information newly received include information relating to a defined program that coincides in a "broadcasting start time" and a "channel" with a reserved program stored in the reservation information storage 36 and coincides therewith in at least a part of a "program title", and considers that the defined program satisfying the conditions coincides with the reserved program. However, an algorithm of the comparison operation and the determination operation by the reservation updating unit 333 is not limited to the foregoing.

The reservation updating unit 333 may determine whether or not the plurality of first program information newly received include information that coincides with information relating to the reserved program stored in the reservation information storage 36 by the following algorithm.

For example, the reservation updating unit 333 may determine whether or not the plurality of first program information newly received include information relating to a defined program that completely coincides in a "channel", a "broadcasting start time", and a "program title" with the reserved program stored in the reservation information storage 36, and consider that the defined program satisfying the conditions is identical to the reserved program.

The reservation updating unit 333 may determine whether or not the plurality of first program information newly received include information relating to a defined program that coincides in a "channel" with the reserved program stored in the reservation information storage 36 and coincides therewith in at least a part of a "program title", and consider that the defined program satisfying the conditions is identical to the reserved program.

Furthermore, the reservation updating unit 333 may determine whether or not the plurality of first program information newly received include information relating to a defined program that coincides in a "broadcasting start time" with the reserved program stored in the reservation information storage 36 and coincides therewith in the length of a character string of a "program title", and consider that the defined program satisfying the conditions is identical to the reserved program.

In each of the plurality of first program information, "additional information" relating to the detailed description of the program may be further associated with each of the defined programs. In each of the plurality of second program information, "additional information" relating to the detailed description of the program may be further associated with each of the future programs.

In this case, the reservation updating unit 333 may determine whether or not the plurality of first program information newly received include information relating to a defined program that completely coincides in "additional information" with the reserved program stored in the reservation information storage 36, and consider that the defined program satisfying the conditions is identical to the reserved program.

Furthermore, the reservation updating unit 333 may determine whether or not the plurality of first program information newly received include information relating to a defined program that coincides in at least a part of "additional information" with the reserved program stored in the reservation information storage 36, and consider that the defined program satisfying the conditions is identical to the reserved program.

In addition thereto, the reservation updating unit 333 determines whether or not the plurality of first program information newly received include information relating to a defined program that coincides in a "program title" with the reserved program stored in the reservation information storage 36, and consider that the defined program satisfying the conditions is identical to the reserved program.

Furthermore, the reservation updating unit 333 may determine, when it includes no information relating to a defined program that coincides in a "program title" with the reserved program, whether or not the plurality of first program information newly received include information relating to a defined program that coincides in a "broadcasting start time" with the reserved program stored in the reservation information storage 36 and coincides therewith in the length of a character string of a "program title", and consider that the defined program satisfying the conditions is identical to the reserved program.

(g) Example of Other Configuration of Broadcasting System

In the broadcasting system 1 according to the first embodiment, a plurality of second program information need not necessarily be generated by the broadcasting information generation device 17 in the broadcasting station apparatus 10. The broadcasting system 1 may have the following configuration.

Figure 17:
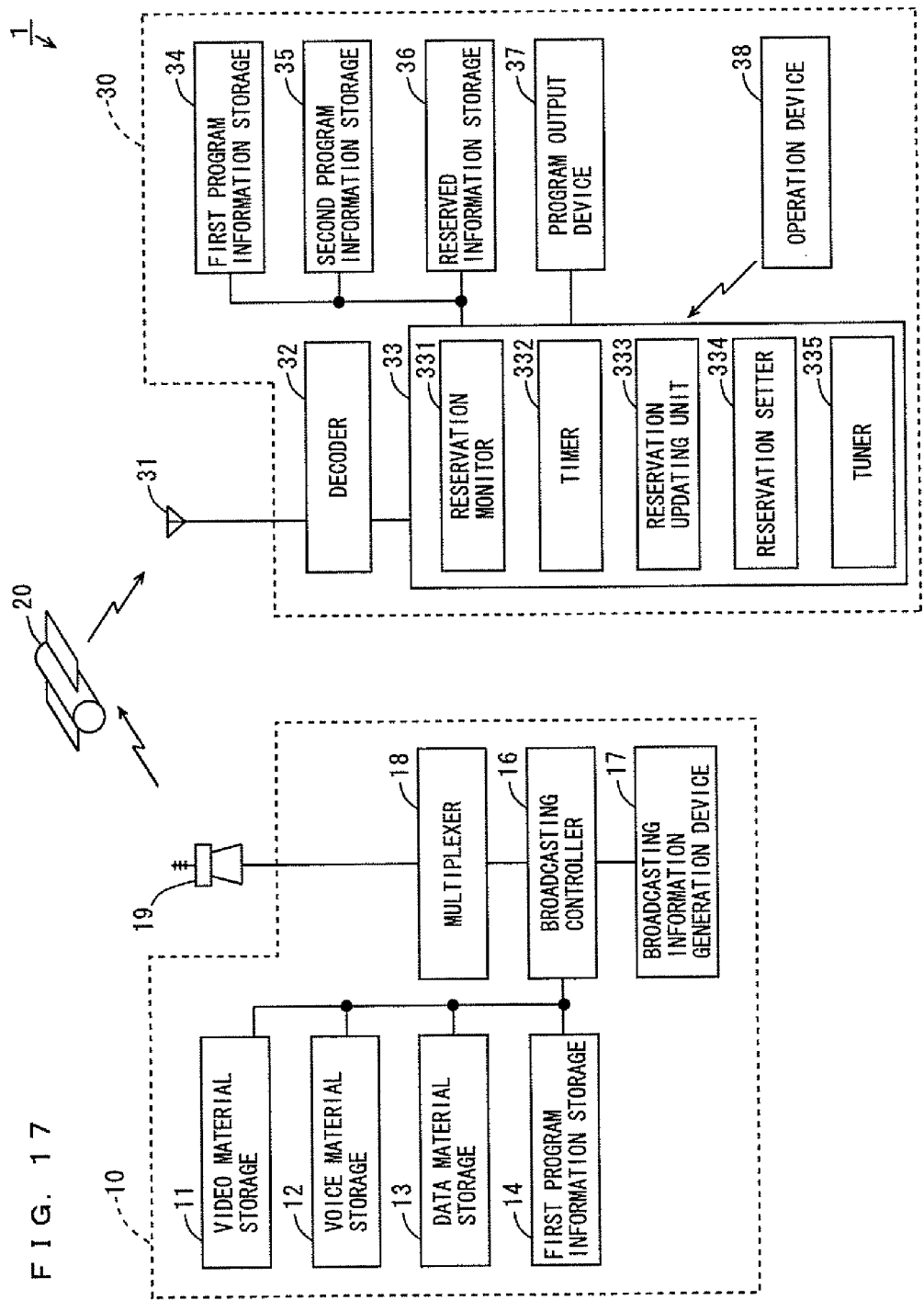
FIG. 17 is a block diagram showing the other configuration of the broadcasting system according to the first embodiment.

FIG. 17 is a block diagram showing the other configuration of the broadcasting system 1 according to the first embodiment. A broadcasting system 1 shown in FIG. 17 differs in the configuration from the broadcasting system 1 shown in FIG. 1 in the following points.

In the broadcasting system 1 shown in FIG. 17, second program information is generated by a viewer operating an operation device 38. Consequently, a broadcasting station apparatus 10 shown in FIG. 17 is not provided with the second program information storage 15 shown in FIG. 1.

In this case, the viewer can generate the second program information using the operation device 38 by acquiring information relating to a future program from media such as a magazine and the Internet. The second program information generated by the viewer is transmitted to a controller 33 from the operation device 38. Thus, the second program information is acquired by the controller 33, and is stored in a second program information storage 35.

FIG. 18 is a block diagram showing the still other configuration of the broadcasting system 1 according to the first embodiment. A broadcasting system 1 shown in FIG. 18 differs in the configuration from the broadcasting system 1 shown in FIG. 1 in the following points.

In the broadcasting system 1 shown in FIG. 18, a broadcasting station apparatus 10 is not provided with the second program information storage 15 shown in FIG. 1. On the other hand, a receiving device 30 is further provided with an Internet communication unit 39. The internet communication unit 39 is connected to the Internet 40.

In the broadcasting system 1 shown in FIG. 18, second program information generated by each broadcasting station is stored in a server (not shown) connected to the Internet 40.

Therefore, a controller 33 in the receiving device 30 downloads the second program information from the server through the Internet communication unit 39 and the Internet 40. In this case, the downloaded second program information is acquired by the controller 33, and is stored in a second program information storage 35.

Furthermore, in the broadcasting systems 1 shown in FIGS. 1, 17, and 18, a broadcasting signal is transmitted to the receiving device 30 by radio through a satellite 20 from the broadcasting station apparatus 10, as described above.

However, transmission means of the broadcasting signal from the broadcasting station apparatus 10 to the receiving device 30 is not limited to the same. For example, the broadcasting signal may be transmitted to the receiving device 30 by wire through a cable from the broadcasting station apparatus 10.

(h) As to Receiving Device

Although in the present embodiment, description was made of an example in which the receiving device 30 is a television receiver, it may be a recording/reproduction device that records information on a recording medium such as a video tape, a DVD, or a HD and reproduces the information recorded on the recording medium. In this case, a program output device 37 includes an output terminal of a video signal, an audio signal, and a data signal.

(2) Second Embodiment (a) Details of First and Second Program Information

Description is made of a broadcasting system according to a second embodiment. The broadcasting system according to the second embodiment has the same configuration as that of the broadcasting system 1 according to the first embodiment. In the broadcasting system according to the second embodiment, information included in each of a plurality of first and second program information differs from the information included in each of the plurality of first and second program information used in the first embodiment.

FIGS. 19 and 20 are diagrams showing examples of the first and second program information that are changed with an elapse of the date of transmission of a broadcasting signal in the broadcasting system according to the second embodiment.

FIG. 19*a* shows an example of first program information on May 1, and FIG. 19*b* shows an example of second program information on May 1. FIG. 20*a* shows an example of first program information on May 2, and FIG. 20*b* shows an example of second program information on May 2.

As shown in FIGS. 19*a* and 20*a*, a "channel", a "broadcasting start time", a "program title", and a "genre" are associated with a defined program in the first program information used for the broadcasting system according to the present embodiment, and a "first program identifier" and a "second program identifier" are associated therewith.

In the present embodiment, the "first program identifier" corresponds to the "program identifier" used for the broadcasting system 1 according to the first embodiment.

As shown in FIGS. 19*b* and 20*b*, a "channel", a "broadcasting start time", and a "program title" are associated with a future program in the second program information used for the broadcasting system according to the present embodiment, and a "second program identifier" is associated therewith.

The "second program identifier" is given to the future program by a broadcasting information generation device 17 when the organization of the future program is determined.

Thereafter, the broadcasting information generation device 17 generates, when days have elapsed and the "broadcasting start time" for the future program is within a predetermined time period from the date of transmission of the broadcasting signal, information relating to a defined program having the same contents as those of information relating to the future program, and gives the defined program the same "second program identifier" as that given to the future program.

Here, a future program "Live Broadcast of World Cup Sports" at the time point of May 1 (see an arrow T in FIG. 19*b*) and a defined program "program title: Special Live Broadcast of World Cup Sports" at the time point of May 2 (see an arrow U in FIG. 20*a*) are programs having the same contents, as in the first embodiment.

The broadcasting information generation device 17 gives, when it gives "second program identifier: 99902" to the future program "Live Broadcast of World Cup Sports" at the time point of May 1 (see the arrow T in FIG. 19*b*), "second program identifier: 99902" to the defined program "Special Live Broadcast of World Cup Sports" at the time point of May 2 (see the arrow U in FIG. 20*a*), as shown in FIG. 19*b*, for example.

Since a defined program indicated by an arrow R in FIG. 20*a* at the time point of May 2, for example, does not exist as a future program in the second program information shown in FIG. 19*b* at the time point of May 1, however, it is given no second program identifier.

In the broadcasting system according to the second embodiment, therefore, each of the plurality of first and second program information is given a "second program identifier" common between a defined program and a future program that correspond to each other.

Consequently, the reservation updating unit 333 in the receiving device 30 (see FIG. 1) can determine whether or not a plurality of first program information newly received include information that coincides with information relating to a reserved program stored in a reservation information storage 36 by an algorithm using the "second program identifier" in the steps S202 and S203 shown in FIG. 7.

For example, the reservation updating unit 333 can determine whether or not the plurality of first program information newly received include information relating to a defined program that coincides in a "second program identifier" with the reserved program stored in the reservation information storage 36, and consider that the defined program satisfying the conditions is identical to the reserved program.

In this case, the reservation updating unit 333 can reliably determine, even when a "program title" associated with the future program differs from a "program title" associated with the same defined program as the future program, whether or not the plurality of first program information include information that coincides with the information relating to the reserved program stored in the reservation information storage 36 on the basis of the "second program identifier".

(b) Method of Transmitting First and Second Program Information

FIG. 21 is a diagram showing an example of the respective configurations of first and second packets used for the broadcasting system according to the second embodiment. FIG. 21*a* shows a first packet PB1, and FIG. 21*b* shows a second packet PB2.

The first packet PB1 shown in FIG. 21*a* includes a "first flag", a "first program identifier", a "channel", a "broadcasting start time", a "program title", a "genre", and a "second program identifier" in this order.

The second packet PB2 shown in FIG. 21*b* includes a "second flag", a "channel" a "broadcasting start time", a "program title", and a "second program identifier" in this order.

The above-mentioned "first flag" indicates that the subsequent information is first program information. The "second flag" indicates that the subsequent information is second program information. This allows the receiver 30 to identify the first and second program information in the broadcasting signal by the "first flag" and the "second flag".

(3) Correspondences Between Various Elements Recited in the Claims Below and Those Described Above with Respect to Various Preferred Embodiments of the Present Invention In the first and second embodiments, the broadcasting controller 16 and the multiplexer 18 correspond to a transmitter, the broadcasting controller 16 and the broadcasting information generation device 17 correspond to a program information generator, the program identifier in the first embodiment and the first program identifier in the second embodiment correspond to a first program identifier, and one or plural of the "program title", the "broadcasting start time", the "channel", and the "program identifier" associated with the broadcasting scheduled program in the first and second program information correspond to organization information.

The decoder 32 and the controller 33 correspond to a receiver, the decoder 32, the controller 33, and the Internet communication unit 39 correspond to an acquisition unit, the first program information storage 34 and the second program information storage 35 correspond to a storage, the reservation monitor 331, the timer 332, the reservation setter 334, or the operation device 38 corresponds to a reservation unit.

Furthermore, the operation device 38 corresponds to an input device, the reservation information storage 36 corresponds to a storing unit, the reservation updating unit 333 in the controller 33 corresponds to a replacement unit, the controller 33 and the program output device 37 correspond to an output unit, and the reservation updating unit 333 corresponds to a determination unit.

INDUSTRIAL APPLICABILITY

The present invention is applicable to a broadcasting system such as a television broadcasting system, a broadcasting station apparatus, a receiving device, and a broadcasting method.

The invention claimed is:

1. A broadcasting system receiver that receives a broadcasting signal including contents of a program transmitted from a broadcasting station apparatus, wherein
organization of all broadcasting scheduled programs to be broadcasted within a predetermined time period from a date of transmission of said broadcasting signal is defined on or before the date of transmission of said broadcasting signal,
each of said all broadcasting scheduled programs within said predetermined time period is given a first program identifier for identifying the broadcasting scheduled program on or before the date of transmission of said broadcasting signal,
each of broadcasting scheduled programs that are provisionally determined to be broadcasted after said predetermined time period is given a second program identifier for identifying the broadcasting scheduled program,
said broadcasting station apparatus generates first program information relating to each of said all broadcasting scheduled programs within said predetermined time period and also generates second program information relating to each of said provisionally determined broadcasting scheduled programs,
the first program information includes the first program identifier and organization information relating to organization of the broadcasting scheduled program and is transmitted from said broadcasting station apparatus,
the second program information includes the second program identifier and organization information relating to organization of the broadcasting scheduled programs, but does not include the first program identifier, and is transmitted from said broadcasting station apparatus or stored in a predetermined server connected to the Internet,
after an elapse of time, when organization of a provisionally determined broadcasting scheduled program is defined, a first program identifier is added to the second program information relating to the provisionally determined broadcasting scheduled program, and the organization information included in the second program information relating to the provisionally determined broadcasting scheduled program is changed to the organization information relating to the defined organization, so that the second program information relating to the provisionally determined broadcasting scheduled program is changed to first program information, and the changed first program information is transmitted from said broadcasting station apparatus,
said broadcasting system receiver comprising:
a receiver that receives the broadcasting signal transmitted from said broadcasting station apparatus and the first program information transmitted from said broadcasting station apparatus;
an acquisitioner that acquires the second program information transmitted from said broadcasting station apparatus or acquires the second program information stored in said predetermined server through the Internet;
a storage that stores the first program information received by said receiver and the second program information acquired by said acquisitioner;
a reserver configured to reserve the broadcasting scheduled program to be broadcasted within said predetermined time period on the basis of the first program information stored in said storage, and to reserve the provisionally determined broadcasting scheduled program on the basis of the second program information stored in said storage;
a storer that stores the first program information when said reserver reserves the broadcasting scheduled program to be broadcasted within said predetermined time period, and stores the second program information when said reserver reserves the provisionally determined broadcasting scheduled program;
a replacer that replaces, after said reserver reserves the provisionally determined broadcasting scheduled program, then after an elapse of time, when the first program information including a same second program identifier as the second program identifier included in the second program information relating to the reserved broadcasting scheduled program is received, the second program information is stored in said storer with the received first program information; and
an outputter that outputs a broadcasting signal corresponding to the broadcasting scheduled program reserved by said reserver on a basis of the first program identifier in the first program information stored in said storage.

2. A broadcasting method for transmitting a broadcasting signal including contents of a program by a broadcasting station apparatus and receiving the broadcasting signal including the contents of the program by a broadcasting system receiver, wherein
organization of all broadcasting scheduled programs to be broadcasted within a predetermined time period from a date of transmission of said broadcasting signal is defined on or before the date of transmission of said broadcasting signal,
each of said all broadcasting scheduled programs within said predetermined time period is given a first program identifier for identifying the broadcasting scheduled program on or before the date of transmission of said broadcasting signal,
each of broadcasting scheduled programs that are provisionally determined to be broadcasted after said predetermined time period is given a second program identifier for identifying the broadcasting scheduled program,
said method comprising:
transmitting the broadcasting signal by said broadcasting station apparatus;
generating first program information that includes the first program identifier and organization information relating to organization of the broadcasting scheduled program and that relates to each of said all broadcasting scheduled programs within said predetermined time period in said broadcasting station apparatus;

transmitting the generated first program information by said broadcasting station apparatus;

generating second program information that includes the second program identifier and organization information relating to organization of the broadcasting scheduled program, does not include the first program identifier, and relates to each of said provisionally determined broadcasting scheduled programs in said broadcasting station apparatus;

transmitting the generated first program information from said broadcasting station apparatus or storing the generated first program information in a predetermined server connected to the Internet by said broadcasting station apparatus;

adding, after an elapse of time, when organization of a provisionally determined broadcasting scheduled program is defined, a first program identifier to the second program information relating to the provisionally determined broadcasting scheduled program, and changing the organization information included in the second program information relating to the provisionally determined broadcasting scheduled program to the organization information relating to the defined organization, thereby changing the second program information relating to the provisionally determined broadcasting scheduled program to first program information in said broadcasting station apparatus;

transmitting the changed first program information by said broadcasting station apparatus;

receiving the broadcasting signal transmitted from said broadcasting station apparatus and the first program information transmitted from said broadcasting station apparatus in said broadcasting system receiver;

acquiring the second program information transmitted from said broadcasting station apparatus or acquiring the second program information stored in said predetermined server through the Internet in said broadcasting system receiver;

accumulating the received first program information and the acquired second program information in said broadcasting system receiver;

reserving the broadcasting scheduled program on the basis of the accumulated first program information by said broadcasting system receiver, and reserving the provisionally determined broadcasting scheduled program on the basis of the accumulated second program information by said broadcasting system receiver;

storing the first program information by said broadcasting system receiver when the broadcasting scheduled program to be broadcasted within said predetermined period is reserved, and storing the second program information by said broadcasting system receiver when the provisionally determined broadcasting scheduled program is reserved;

replacing, after the provisionally determined broadcasting scheduled program is reserved, then after an elapse of time, when the first program information that includes a same second program identifier as the second program identifier included in the second program information relating to the reserved broadcasting scheduled program is received, the stored second program information with the received first program information by said broadcasting system receiver; and outputting a broadcasting scheduled program corresponding to the broadcasting scheduled program reserved by said broadcasting system receiver on a basis of the first program identifier in the stored first program information.

* * * * *